(12) United States Patent
Brunzema et al.

(10) Patent No.: US 12,147,324 B2
(45) Date of Patent: Nov. 19, 2024

(54) DIFFERENTIAL LOGGING OF COMPUTING PROCESSES

(71) Applicant: SAP SE, Walldorf (DE)

(72) Inventors: Martin Brunzema, Berlin (DE); Henrik Hempelmann, Havelberg (DE); Florian Geckeler, Berlin (DE); Kathrin Mao, Berlin (DE); Anne Roessiger, Berlin (DE); Paul Beck, Berlin (DE)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 17/643,964

(22) Filed: Dec. 13, 2021

(65) Prior Publication Data
US 2023/0185691 A1 Jun. 15, 2023

(51) Int. Cl.
*G06F 11/34* (2006.01)
*G06F 11/14* (2006.01)
*H04L 9/08* (2006.01)

(52) U.S. Cl.
CPC ...... *G06F 11/3476* (2013.01); *G06F 11/1458* (2013.01); *H04L 9/0891* (2013.01)

(58) Field of Classification Search
None
See application file for complete search history.

(56) References Cited

U.S. PATENT DOCUMENTS

| 11,526,504 B1* | 12/2022 | Moshgabadi | G06F 16/245 |
| 2019/0012357 A1* | 1/2019 | Schreter | G06F 3/0631 |
| 2020/0401562 A1* | 12/2020 | Demoor | G06F 16/1865 |
| 2022/0058068 A1* | 2/2022 | Jha | G06F 11/3006 |

* cited by examiner

*Primary Examiner* — Thu N Nguyen
(74) *Attorney, Agent, or Firm* — Klarquist Sparkman, LLP

(57) ABSTRACT

Techniques and solutions are provided to facilitate logging of computing processes. A computing process generates multiple log entries. A first portion of the multiple log entries are written to a first log. A second portion of the multiple log entries are written to the first log and to a second log, where the second portion is less than the first portion, such as being a proper subset of the first portion. Log entries can be determined to be written to the second log by scanning all or a portion of a log, by evaluating log entries as they are generated, or through computer code that causes log entries to be written to the second log. Typically, the second log is maintained for a longer period of time than the first log.

30 Claims, 52 Drawing Sheets

```
{"log":"DB_H00/indexserver_c67db375-4bc9-494d-8e9f-86b919b36677d.30040.executed_statements.000.trc:
202663;113;0;87043095712:3015;a7a726ead74e757a2cb1782272009afc;_SYS_STATISTICS:;1635762156384611;2947;_SYS_STATISTICS._SYS_STATISTICS.STATISTICS_PROPERTI
ES_SYS_STATISTICS.STATISTICS_SCHEDULE;0;;;;;0;;;;0;;15;_SYS_STATISTICS;0;\n","stream":"stdout","time":"2021-11-01T10:22:36.389879135Z"}
{"log":"DB_H00/indexserver_c67db375-4bc9-494d-8e9f-86b919b36677d.30040.executed_statements.000.trc: #CREATE or replace PROCEDURE
_SYS_STATISTICS.statistics_prepare_call_manual (IN schedulable_id integer, OUT can_call integer, OUT calltime_utc timestamp) LANGUAGE SQLSCRIPT SQL SECURITY INVOKER
AS\n","stream":"stdout","time":"2021-11-01T10:22:36.389883214Z"}
{"log":"DB_H00/indexserver_c67db375-4bc9-494d-8e9f-86b919b36677d.30040.executed_statements.000.trc: #BEGIN\n","stream":"stdout","time":"2021-11-01T10:22:36.389885958Z"}
{"log":"DB_H00/indexserver_c67db375-4bc9-494d-8e9f-86b919b36677d.30040.executed_statements.000.trc: #-- schedulable_id [IN]: alert or collector to be called\
n","stream":"stdout","time":"2021-11-01T10:22:36.389888264Z"}
{"log":"DB_H00/indexserver_c67db375-4bc9-494d-8e9f-86b919b36677d.30040.executed_statements.000.trc: #-- can_call [OUT]: is the caller allowed to call NOW\
n","stream":"stdout","time":"2021-11-01T10:22:36.389892617Z"}
{"log":"DB_H00/indexserver_c67db375-4bc9-494d-8e9f-86b919b36677d.30040.executed_statements.000.trc: #-- calltime_utc [OUT]: current UTC time of database\
n","stream":"stdout","time":"2021-11-01T10:22:36.389895206Z"}
{"log":"DB_H00/indexserver_c67db375-4bc9-494d-8e9f-86b919b36677d.30040.executed_statements.000.trc: #DECLARE v_installing int = 1;\n","stream":"stdout","time":"2021-11-
01T10:22:36.389989753Z"}
{"log":"DB_H00/indexserver_c67db375-4bc9-494d-8e9f-86b919b36677d.30040.executed_statements.000.trc: #can_call =0;\n","stream":"stdout","time":"2021-11-01T10:22:36.389899977Z"}
{"log":"DB_H00/indexserver_c67db375-4bc9-494d-8e9f-86b919b36677d.30040.executed_statements.000.trc: #select count(*) into v_installing from
_SYS_STATISTICS.STATISTICS_PROPERTIES where key='internal.installation.state' and value like 'Installing%';\n","stream":"stdout","time":"2021-11-01T10:22:36.389901972Z"}
{"log":"DB_H00/indexserver_c67db375-4bc9-494d-8e9f-86b919b36677d.30040.executed_statements.000.trc: #if :v_installing=1 then\n","stream":"stdout","time":"2021-11-
01T10:22:36.389904507Z"}
{"log":"DB_H00/indexserver_c67db375-4bc9-494d-8e9f-86b919b36677d.30040.executed_statements.000.trc: # return;\n","stream":"stdout","time":"2021-11-01T10:22:36.389908114Z"}
{"log":"DB_H00/indexserver_c67db375-4bc9-494d-8e9f-86b919b36677d.30040.executed_statements.000.trc: #end if;\n","stream":"stdout","time":"2021-11-01T10:22:36.389910538Z"}
{"log":"DB_H00/indexserver_c67db375-4bc9-494d-8e9f-86b919b36677d.30040.executed_statements.000.trc: #calltime_utc = current_utctimestamp;\n","stream":"stdout","time":"2021-11-
01T10:22:36.389913782Z"}
{"log":"DB_H00/indexserver_c67db375-4bc9-494d-8e9f-86b919b36677d.30040.executed_statements.000.trc: #update _SYS_STATISTICS.STATISTICS_SCHEDULE set status='Manual',
statusreason='', latest_start_servertime_manual=add_seconds_between(current_utctimestamp, current_timestamp)) where id=:schedulable_id and status='Idle';\
n","stream":"stdout","time":"2021-11-01T10:22:36.389947354Z"}
{"log":"DB_H00/indexserver_c67db375-4bc9-494d-8e9f-86b919b36677d.30040.executed_statements.000.trc: #if ::ROWCOUNT \u003e 0 then\n","stream":"stdout","time":"2021-11-
01T10:22:36.389955938Z"}
{"log":"DB_H00/indexserver_c67db375-4bc9-494d-8e9f-86b919b36677d.30040.executed_statements.000.trc: # can_call = 1;\n","stream":"stdout","time":"2021-11-
01T10:22:36.389958747Z"}
{"log":"DB_H00/indexserver_c67db375-4bc9-494d-8e9f-86b919b36677d.30040.executed_statements.000.trc: #end if;\n","stream":"stdout","time":"2021-11-01T10:22:36.389961055Z"}
{"log":"DB_H00/indexserver_c67db375-4bc9-494d-8e9f-86b919b36677d.30040.executed_statements.000.trc: \n","stream":"stdout","time":"2021-11-01T10:22:36.389976753Z"}
{"log":"DB_H00/indexserver_c67db375-4bc9-494d-8e9f-86b919b36677d.30040.executed_statements.000.trc: #END;\n","stream":"stdout","time":"2021-11-01T10:22:36.389982895Z"}
{"log":"DB_H00/indexserver_c67db375-4bc9-494d-8e9f-86b919b36677d.30040.executed_statements.000.trc: \n","stream":"stdout","time":"2021-11-01T10:22:36.389865022Z"} :
RootKeyManager serves keys for database 'H00' (ID: 3)\n","stream":"stdout","time":"2021-11-01 10:22:32.169437 i RootKeyManager RootKeyManager.cpp(00183) ;
{"log":"DB_H00/indexserver_c67db375-4bc9-494d-8e9f-86b919b36677d.30040.000.trc: [2412]{-1}[-1/-1] 2021-11-01 10:22:36.994508 i STATS_WORKER ConfigurableRegistry.cpp(00436)
: call _SYS_STATISTICS.Shared_Build_SR_Views (' ')\n","stream":"stdout","time":"2021-11-01T10:22:37.266791507Z"}
{"log":"DB_H00/indexserver_c67db375-4bc9-494d-8e9f-86b919b36677d.30040.000.trc: [2893]{-1}[-1/-1] 2021-11-01 10:22:36.389976753Z"}
: call _SYS_STATISTICS.Shared_Build_SR_Views (' '); done\n","stream":"stdout","time":"2021-11-01T10:22:37.266795066Z"}
{"log":"DB_H00/indexserver_c67db375-4bc9-494d-8e9f-86b919b36677d.30040.000.trc: [2893]{-1}[-1/-1] 2021-11-01 10:22:37.194004 i STATS_WORKER ConfigurableRegistry.cpp(00439)
```

{"log":"DB_H00/backup.log: 2021-11-01T10:22:39+00:00 P0002344    17cdb05b99b INFO    BACKUP    state of service: indexserver, c67db375-4bc9-494d-8e9f-86b919b3677d:30040, volume: 2, BackupSynchronizeSavepointFinished\n","stream":"stdout","time":"2021-11-01T10:22:39.006417921Z"}
{"log":"DB_H00/backup.log: 2021-11-01T10:22:39+00:00 P0002344    17cdb05b99b INFO    BACKUP    state of service: indexserver, c67db375-4bc9-494d-8e9f-86b919b3677d:30040, volume: 2, BackupFinishSavepointInProgress\n","stream":"stdout","time":"2021-11-01T10:22:39.006431601Z"}
{"log":"DB_H00/backup.log: 2021-11-01T10:22:39+00:00 P0002344    17cdb05b99b INFO    BACKUP    state of service: dpserver, c67db375-4bc9-494d-8e9f-86b919b3677d:30043, volume: 3, BackupFinishSavepointInProgress\n","stream":"stdout","time":"2021-11-01T10:22:39.006924144Z"}
{"log":"DB_H00/backup.log: 2021-11-01T10:22:39+00:00 P0002344    17cdb05b99b INFO    BACKUP    state of service: dpserver, c67db375-4bc9-494d-8e9f-86b919b3677d:30043, volume: 3, DataBackupLssExport\n","stream":"stdout","time":"2021-11-01T10:22:39.110879486Z"}
{"log":"DB_H00/backup.log: 2021-11-01T10:22:39+00:00 P0002344    17cdb05b99b INFO    BACKUP    state of service: indexserver, c67db375-4bc9-494d-8e9f-86b919b3677d:30040, volume: 2, DataBackupLssExport\n","stream":"stdout","time":"2021-11-01T10:22:39.207105814Z"}
{"log":"DB_H00/backup.log: 2021-11-01T10:22:39+00:00 P0002344    17cdb05b99b INFO    BACKUP    state of service: dpserver, c67db375-4bc9-494d-8e9f-86b919b3677d:30043, volume: 3, BackupFinishSavepointFinished\n","stream":"stdout","time":"2021-11-01T10:22:39.252005748Z"}
{"log":"DB_H00/backup.log: 2021-11-01T10:22:39+00:00 P0002344    17cdb05b99b INFO    BACKUP    state of service: indexserver, c67db375-4bc9-494d-8e9f-86b919b3677d:30040, volume: 2, BackupFinishSavepointFinished\n","stream":"stdout","time":"2021-11-01T10:22:39.333840801Z"}
{"log":"DB_H00/backup.log: 2021-11-01T10:22:39+00:00 P0002344    17cdb05b99b INFO    BACKUP    BACKUP will write to the following files : \
n","stream":"stdout","time":"2021-11-01T10:22:39.333948314Z"}
{"log":"DB_H00/backup.log: 2021-11-01T10:22:39+00:00 P0002344    17cdb05b99b INFO    BACKUP    to backint: /usr/sap/H00/SYS/global/hdb/backint/DB_H00/initial_databackup_0_1\n","stream":"stdout","time":"2021-11-01T10:22:39.333956884Z"}
{"log":"DB_H00/backup.log: 2021-11-01T10:22:39+00:00 P0002344    17cdb05b99b INFO    BACKUP    to backint: /usr/sap/H00/SYS/global/hdb/backint/DB_H00/initial_databackup_2_1\n","stream":"stdout","time":"2021-11-01T10:22:39.333962435Z"}
{"log":"DB_H00/backup.log: 2021-11-01T10:22:39+00:00 P0002344    17cdb05b99b INFO    BACKUP    to backint: /usr/sap/H00/SYS/global/hdb/backint/DB_H00/initial_databackup_3_1\n","stream":"stdout","time":"2021-11-01T10:22:39.333967904Z"}
{"log":"DB_H00/backup.log: 2021-11-01T10:22:39+00:00 P0002344    17cdb05b99b INFO    BACKUP    state of service: indexserver, c67db375-4bc9-494d-8e9f-86b919b3677d:30040, volume: 2, BackupExecuteTopologyBackupInProgress\n","stream":"stdout","time":"2021-11-01T10:22:39.334577595Z"}
{"log":"daemon_c67db375-4bc9-494d-8e9f-86b919b3677d.30000.000.trc: [1210]{-1}[-1/-1] 2021-11-01 10:22:31.497608 i Daemon           Daemon.cpp(00152) : Shared memory updated, no daemon state change\n","stream":"stdout","time":"2021-11-01T10:22:39.363029818Z"}
{"log":"daemon_c67db375-4bc9-494d-8e9f-86b919b3677d.30000.000.trc: [1210]{-1}[-1/-1] 2021-11-01 10:22:39.361454 i Daemon           NetworkListener.cpp(01096) : New connection accepted from 100.96.5.8/56648_tcp over socket 13\n","stream":"stdout","time":"2021-11-01T10:22:39.363051641Z"}
{"log":"daemon_c67db375-4bc9-494d-8e9f-86b919b3677d.30000.000.trc: [1210]{-1}[-1/-1] 2021-11-01 10:22:39.361777 i Daemon           NetworkConnection.cpp(00226) : Connection from 100.96.5.8/56648_tcp (pid 2344) over socket 13. Process 'hdbindexserver'. Received message \"execute backint\"\n","stream":"stdout","time":"2021-11-01T10:22:39.363055989Z"}

{"log":"H00/lss_c67db375-4bc9-494d-8e9f-86b919b3677d.H00.000.trc: [2320][-1][-1/-1] 2021-11-01 10:22:37.980827 i RequestHandler RequestHandler.cpp(00048) : readValue() took 37 us\n","stream":"stdout","time":"2021-11-01T10:22:39.995395159Z"}
{"log":"H00/lss_c67db375-4bc9-494d-8e9f-86b919b3677d.H00.000.trc: [2333][-1][-1/-1] 2021-11-01 10:22:39.010162 i RequestHandler RequestHandler.cpp(00048) : getCurrentKeyMetadata() took 80 us\n","stream":"stdout","time":"2021-11-01T10:22:39.995412702Z"}
{"log":"H00/lss_c67db375-4bc9-494d-8e9f-86b919b3677d.H00.000.trc: [2320][-1][-1/-1] 2021-11-01 10:22:39.011778 i RequestHandler RequestHandler.cpp(00048) : getCurrentKeyMetadata() took 52 us\n","stream":"stdout","time":"2021-11-01T10:22:39.995417049Z"}
{"log":"H00/lss_c67db375-4bc9-494d-8e9f-86b919b3677d.H00.000.trc: [2334][-1][-1/-1] 2021-11-01 10:22:39.048412 i RequestHandler RequestHandler.cpp(00048) : getCurrentKey() took 78 us\n","stream":"stdout","time":"2021-11-01T10:22:39.995421037Z"}
{"log":"H00/lss_c67db375-4bc9-494d-8e9f-86b919b3677d.H00.000.trc: [2319][-1][-1/-1] 2021-11-01 10:22:39.097479 i RequestHandler RequestHandler.cpp(00048) : getCurrentKeyMetadata() took 79 us\n","stream":"stdout","time":"2021-11-01T10:22:39.995424621Z"}
{"log":"H00/lss_c67db375-4bc9-494d-8e9f-86b919b3677d.H00.000.trc: [2333][-1][-1/-1] 2021-11-01 10:22:39.100147 i RequestHandler RequestHandler.cpp(00048) : getCurrentKeyMetadata() took 61 us\n","stream":"stdout","time":"2021-11-01T10:22:39.995427972Z"}
{"log":"H00/lss_c67db375-4bc9-494d-8e9f-86b919b3677d.H00.000.trc: [2320][-1][-1/-1] 2021-11-01 10:22:39.101336 i RequestHandler RequestHandler.cpp(00048) : getCurrentKey() took 48 us\n","stream":"stdout","time":"2021-11-01T10:22:39.995431152Z"}
{"log":"H00/lss_c67db375-4bc9-494d-8e9f-86b919b3677d.H00.000.trc: [2334][-1][-1/-1] 2021-11-01 10:22:39.111853 i RequestHandler RequestHandler.cpp(00048) : ping() took 12 us\n","stream":"stdout","time":"2021-11-01T10:22:39.995434438Z"}
{"log":"H00/lss_c67db375-4bc9-494d-8e9f-86b919b3677d.H00.000.trc: [2319][-1][-1/-1] 2021-11-01 10:22:39.112390 i RequestHandler RequestHandler.cpp(00048) : ping() took 12 us\n","stream":"stdout","time":"2021-11-01T10:22:39.995446886Z"}
{"log":"H00/lss_c67db375-4bc9-494d-8e9f-86b919b3677d.H00.000.trc: [2333][-1][-1/-1] 2021-11-01 10:22:39.112681 i Backup BnR.cpp(00375) : Running export for tenant H00\n","stream":"stdout","time":"2021-11-01T10:22:39.995450074Z"}
{"log":"H00/lss_c67db375-4bc9-494d-8e9f-86b919b3677d.H00.000.trc: [2333][-1][-1/-1] 2021-11-01 10:22:39.112692 i Persistence CryptoDBReadLockedImpl.cpp(00024) : PayloadDB \u003e\u003e trying to get write lock\n","stream":"stdout","time":"2021-11-01T10:22:39.995553148Z"}
{"log":"H00/lss_c67db375-4bc9-494d-8e9f-86b919b3677d.H00.000.trc: [2333][-1][-1/-1] 2021-11-01 10:22:39.112833 i Persistence CryptoDBReadLockedImpl.cpp(00028) : PayloadDB \u003e\u003e have write lock\n","stream":"stdout","time":"2021-11-01T10:22:39.995576649Z"}
{"log":"H00/lss_c67db375-4bc9-494d-8e9f-86b919b3677d.H00.000.trc: [2333][-1][-1/-1] 2021-11-01 10:22:39.112846 i Persistence CryptoDBReadLockedImpl.cpp(00024) : ConfigDB \u003e\u003e trying to get write lock\n","stream":"stdout","time":"2021-11-01T10:22:39.995572052Z"}
{"log":"H00/lss_c67db375-4bc9-494d-8e9f-86b919b3677d.H00.000.trc: [2333][-1][-1/-1] 2021-11-01 10:22:39.112933 i Persistence CryptoDBReadLockedImpl.cpp(00028) : ConfigDB \u003e\u003e have write lock\n","stream":"stdout","time":"2021-11-01T10:22:39.995575885Z"}
{"log":"H00/lss_c67db375-4bc9-494d-8e9f-86b919b3677d.H00.000.trc: [2333][-1][-1/-1] 2021-11-01 10:22:39.117237 i Persistence PersistenceImpl.cpp(00339) : ConfigDB \u003e\u003e Revision is: 08000000000000000000000000000000 setContent new\n","stream":"stdout","time":"2021-11-01T10:22:39.995579873Z"}
{"log":"H00/lss_c67db375-4bc9-494d-8e9f-86b919b3677d.H00.000.trc: [2333][-1][-1/-1] 2021-11-01 10:22:39.118910 i Persistence CryptoDBReadLockedImpl.cpp(00040) : ConfigDB \u003e\u003e release write lock\n","stream":"stdout","time":"2021-11-01T10:22:39.995583809Z"}
{"log":"H00/lss_c67db375-4bc9-494d-8e9f-86b919b3677d.H00.000.trc: [2333][-1][-1/-1] 2021-11-01 10:22:39.118923 i Persistence CryptoDBWriteImpl.hpp(00099) : ConfigDB \u003e\u003e CryptoDBWriteImpl: after commit 8\n","stream":"stdout","time":"2021-11-01T10:22:39.995558769Z"}
{"log":"H00/lss_c67db375-4bc9-494d-8e9f-86b919b3677d.H00.000.trc: [2333][-1][-1/-1] 2021-11-01 10:22:39.120581 i Persistence PersistenceImpl.cpp(00339) : PayloadDB \u003e\u003e Revision is: 19000000000000000000000000000000 setContent new\n","stream":"stdout","time":"2021-11-01T10:22:39.995914662Z"}
{"log":"H00/lss_c67db375-4bc9-494d-8e9f-86b919b3677d.H00.000.trc: [2333][-1][-1/-1] 2021-11-01 10:22:39.122232 i Persistence CryptoDBReadLockedImpl.cpp(00040) : PayloadDB \u003e\u003e release write lock\n","stream":"stdout","time":"2021-11-01T10:22:39.995995332Z"}
{"log":"H00/lss_c67db375-4bc9-494d-8e9f-86b919b3677d.H00.000.trc: [2333][-1][-1/-1] 2021-11-01 10:22:39.122243 i Persistence CryptoDBWriteImpl.hpp(00099) : PayloadDB \u003e\u003e CryptoDBWriteImpl: after commit 25\n","stream":"stdout","time":"2021-11-01T10:22:39.995999946Z"}

```
{"log":"H00/lss_c67db375-4bc9-494d-8e9f-86b919b3677d.H00.000.trc: [2319][-1][-1/-1] 2021-11-01 10:22:39.215650 i Persistence    PersistenceImpl.cpp(00339) : ConfigDB \u003e
Revision is: 0a00000000000000 000000000000000 setContent new\n","stream":"stdout","time":"2021-11-01T10:22:39.9957023462"}
{"log":"H00/lss_c67db375-4bc9-494d-8e9f-86b919b3677d.H00.000.trc: [2319][-1][-1/-1] 2021-11-01 10:22:39.217444 i Persistence    CryptoDBReadLockedImpl.cpp(00040) : ConfigDB \
u003e CryptoDBWriteLockedImpl: release write lock\n","stream":"stdout","time":"2021-11-01T10:22:39.9957058332"}
{"log":"H00/lss_c67db375-4bc9-494d-8e9f-86b919b3677d.H00.000.trc: [2319][-1][-1/-1] 2021-11-01 10:22:39.217454 i Persistence    CryptoDBWriteImpl.hpp(00099) : ConfigDB \u003e
CryptoDBWriteImpl: after commit 10\n","stream":"stdout","time":"2021-11-01T10:22:39.995709475Z"}
{"log":"H00/lss_c67db375-4bc9-494d-8e9f-86b919b3677d.H00.000.trc: [2319][-1][-1/-1] 2021-11-01 10:22:39.219325 i Persistence    PersistenceImpl.cpp(00339) : PayloadDB \u003e
Revision is: 1b00000000000000 000000000000000 setContent new\n","stream":"stdout","time":"2021-11-01T10:22:39.9957130922"}
{"log":"H00/lss_c67db375-4bc9-494d-8e9f-86b919b3677d.H00.000.trc: [2319][-1][-1/-1] 2021-11-01 10:22:39.221280 i Persistence    CryptoDBReadLockedImpl.cpp(00040) :
PayloadDB \u003e CryptoDBReadLockedImpl: release write lock\n","stream":"stdout","time":"2021-11-01T10:22:39.9957169652"}
{"log":"H00/lss_c67db375-4bc9-494d-8e9f-86b919b3677d.H00.000.trc: [2319][-1][-1/-1] 2021-11-01 10:22:39.221290 i Persistence    CryptoDBWriteImpl.hpp(00099) : PayloadDB \
u003e CryptoDBWriteImpl: after commit 27\n","stream":"stdout","time":"2021-11-01T10:22:39.9957206132"}
{"log":"H00/lss_c67db375-4bc9-494d-8e9f-86b919b3677d.H00.000.trc: [2319][-1][-1/-1] 2021-11-01 10:22:39.221349 e Crypto    Provider.cpp(00105) : Wrong Provider!\
n","stream":"stdout","time":"2021-11-01T10:22:39.9957276412"}
{"log":"H00/lss_c67db375-4bc9-494d-8e9f-86b919b3677d.H00.000.trc: [2319][-1][-1/-1] 2021-11-01 10:22:39.258771 i Persistence    CryptoDBReadLockedImpl.cpp(00024) : ConfigDB \
u003e CryptoDBReadLockedImpl: trying to get write lock\n","stream":"stdout","time":"2021-11-01T10:22:39.9957313362"}
{"log":"H00/lss_c67db375-4bc9-494d-8e9f-86b919b3677d.H00.000.trc: [2319][-1][-1/-1] 2021-11-01 10:22:39.258892 i Persistence    CryptoDBReadLockedImpl.cpp(00028) : ConfigDB \
u003e CryptoDBReadLockedImpl: have write lock\n","stream":"stdout","time":"2021-11-01T10:22:39.9957349122"}
{"log":"H00/lss_c67db375-4bc9-494d-8e9f-86b919b3677d.H00.000.trc: [2319][-1][-1/-1] 2021-11-01 10:22:39.260784 i Persistence    PersistenceImpl.cpp(00339) : ConfigDB \u003e
Revision is: 0b00000000000000 000000000000000 setContent new\n","stream":"stdout","time":"2021-11-01T10:22:39.9957385422"}
{"log":"H00/lss_c67db375-4bc9-494d-8e9f-86b919b3677d.H00.000.trc: [2319][-1][-1/-1] 2021-11-01 10:22:39.262291 i Persistence    CryptoDBReadLockedImpl.cpp(00040) : ConfigDB \
u003e CryptoDBReadLockedImpl: release write lock\n","stream":"stdout","time":"2021-11-01T10:22:39.9957457222"}
{"log":"H00/lss_c67db375-4bc9-494d-8e9f-86b919b3677d.H00.000.trc: [2319][-1][-1/-1] 2021-11-01 10:22:39.262301 i Persistence    CryptoDBWriteImpl.hpp(00099) : ConfigDB \u003e
CryptoDBWriteImpl: after commit 11\n","stream":"stdout","time":"2021-11-01T10:22:39.9957494032"}
{"log":"H00/lss_c67db375-4bc9-494d-8e9f-86b919b3677d.H00.000.trc: [2319][-1][-1/-1] 2021-11-01 10:22:39.262313 i Persistence    CryptoDBReadLockedImpl.cpp(00024) :
PayloadDB \u003e CryptoDBReadLockedImpl: trying to get write lock\n","stream":"stdout","time":"2021-11-01T10:22:39.9957530512"}
{"log":"H00/lss_c67db375-4bc9-494d-8e9f-86b919b3677d.H00.000.trc: [2319][-1][-1/-1] 2021-11-01 10:22:39.262378 i Persistence    CryptoDBReadLockedImpl.cpp(00028) :
PayloadDB \u003e CryptoDBReadLockedImpl: have write lock\n","stream":"stdout","time":"2021-11-01T10:22:39.9957568342"}
{"log":"H00/lss_c67db375-4bc9-494d-8e9f-86b919b3677d.H00.000.trc: [2319][-1][-1/-1] 2021-11-01 10:22:39.264260 i Persistence    PersistenceImpl.cpp(00339) : PayloadDB \u003e
Revision is: 1c00000000000000 000000000000000 setContent new\n","stream":"stdout","time":"2021-11-01T10:22:39.9957604922"}
{"log":"H00/lss_c67db375-4bc9-494d-8e9f-86b919b3677d.H00.000.trc: [2319][-1][-1/-1] 2021-11-01 10:22:39.265849 i Persistence    CryptoDBReadLockedImpl.cpp(00040) :
PayloadDB \u003e CryptoDBReadLockedImpl: release write lock\n","stream":"stdout","time":"2021-11-01T10:22:39.9957717332"}
{"log":"H00/lss_c67db375-4bc9-494d-8e9f-86b919b3677d.H00.000.trc: [2319][-1][-1/-1] 2021-11-01 10:22:39.265858 i Persistence    CryptoDBWriteImpl.hpp(00099) : PayloadDB \
u003e CryptoDBWriteImpl: after commit 28\n","stream":"stdout","time":"2021-11-01T10:22:39.9957760652"}
{"log":"DB_H00/backint.log: 2021-11-01 10:22:42.027 backint terminated:\n","stream":"stdout","time":"2021-11-01T10:22:42.0300881252"}
{"log":"DB_H00/backint.log:    pid: 3439\n","stream":"stdout","time":"2021-11-01T10:22:42.0300910212"}
{"log":"DB_H00/backint.log:    exit code: 0\n","stream":"stdout","time":"2021-11-01T10:22:42.0300932872"}
{"log":"DB_H00/backint.log:    output:\n","stream":"stdout","time":"2021-11-01T10:22:42.0300591752"}
```

FIG. 9J

```
{"log":"DB_H00/backint.log: [2021-11-01 10:22:40,761] - 3443 MainThread - backup_store:82 - INFO - Start backup of: /usr/sap/H00/SYS/global/hdb/backint/DB_H00/
initial_databackup_0_1 -\u003e Key: c67db375-4bc9-494d-8e9f-86b919b3677d/DB_H00/initial_databackup_0_1\n","stream":"stdout","time":"2021-11-01T10:22:42.030095622Z"}
{"log":"DB_H00/backint.log: #SOFTWAREID \"backint 1.06\"\"SAP Backint for Object Store 0.0.1\"\n","stream":"stdout","time":"2021-11-01T10:22:42.030098887Z"}    900
{"log":"DB_H00/backint.log: #SAVED blOH7OXYlY0AnyCOkDfMUo_8cadvgpt9 /usr/sap/H00/SYS/global/hdb/backint/DB_H00/initial_databackup_0_1 20480\
n","stream":"stdout","time":"2021-11-01T10:22:42.030101309Z"}
{"log":"DB_H00/backint.log: metrics: source: 20480, destination: 20480, seconds: 0.885267019192718506\n","stream":"stdout","time":"2021-11-01T10:22:42.030101362Z"}
{"log":"DB_H00/backup.log: 2021-11-01T10:22:42-00:00 P0002344     17cdb05b99b INFO    BACKUP   state of service: indexserver, c67db375-4bc9-494d-8e9f-86b919b3677d:30040,
volume: 2, BackupExecuteTopologyBackupFinished\n","stream":"stdout","time":"2021-11-01T10:22:42.030855726Z"}
{"log":"DB_H00/backup.log: 2021-11-01T10:22:42-00:00 P0002344     17cdb05b99b INFO    BACKUP   start of progress monitoring, volumes: 2, bytes: 234881024\
n","stream":"stdout","time":"2021-11-01T10:22:42.043230038Z"}
{"log":"DB_H00/backup.log: 2021-11-01T10:22:42-00:00 P0002344     17cdb05b99b INFO    BACKUP   state of service: dpserver, c67db375-4bc9-494d-8e9f-86b919b3677d:30043,
volume: 3, BackupExecuteDataBackupInProgress\n","stream":"stdout","time":"2021-11-01T10:22:42.043252072Z"}
{"log":"DB_H00/backup.log: 2021-11-01T10:22:42-00:00 P0002344     17cdb05b99b INFO    BACKUP   state of service: indexserver, c67db375-4bc9-494d-8e9f-86b919b3677d:30040,
volume: 2, BackupExecuteDataBackupInProgress\n","stream":"stdout","time":"2021-11-01T10:22:42.043268454Z"}
{"log":"daemon_c67db375-4bc9-494d-8e9f-86b919b3677d.30000.000.trc: [1210][-1/-1/-1] 2021-11-01 10:22:39.376124 i Basis            NetworkChannel.cpp(03257) :
[4d67249]1de5f0015,100.96.5.8:30000,.-DAE,0] Stop listening for connections on 100.96.5.8:30000\n","stream":"stdout","time":"2021-11-01T10:22:42.069573164Z"}
{"log":"daemon_c67db375-4bc9-494d-8e9f-86b919b3677d.30000.000.trc: [1210][-1/-1/-1] 2021-11-01 10:22:39.371400 i Daemon           Backint.cpp(00427) : Backint \"/usr/sap/H00/
SYS/global/hdb/opt/hdbbackint -f backup -p /usr/sap/H00/SYS/global/hdb/opt/hdbbackint_H00.hnNlpo -o /var/tmp/hdbbackint_H00.FPmBTc -u H00 -s
163576215797979 -c 3 -l COMPLETE\", requested by process 2344 started with pid 3439\n","stream":"stdout","time":"2021-11-01T10:22:42.069604505Z"}
{"log":"daemon_c67db375-4bc9-494d-8e9f-86b919b3677d.30000.000.trc: [1210][-1/-1/-1] 2021-11-01 10:22:39.371475 i Daemon           NetworkConnection.cpp(00238) : Connection
from 100.96.5.8/56648_tcp (pid 2344) over socket 13. Handled message (\"execute backint\", sending 241 bytes backint","stream":"stdout","time":"2021-11-01T10:22:42.069610663Z"}
{"log":"daemon_c67db375-4bc9-494d-8e9f-86b919b3677d.30000.000.trc: [1210][-1/-1/-1] 2021-11-01 10:22:39.371776 i Daemon           NetworkListener.cpp(01021) : Finishing
connection channel {\u003cNetworkChannelSSLFilter\u003e={\u003cNetworkChannelBase\u003e={this=94919751505560, fd=13, refCnt=1, local=100.96.5.8/30000_tcp,
remote=100.96.5.8/56648_tcp, state=Connected, pending=[---]}}}\n","stream":"stdout","time":"2021-11-01T10:22:42.069616211Z"}
{"log":"daemon_c67db375-4bc9-494d-8e9f-86b919b3677d.30000.000.trc: [1210][-1/-1/-1] 2021-11-01 10:22:39.371801 i Daemon           NetworkListener.cpp(01036) : Closing
connection finished channel {\u003cNetworkChannelSSLFilter\u003e={\u003cNetworkChannelBase\u003e={this=94919751505560, fd=13, refCnt=1, local=100.96.5.8/30000_tcp,
remote=100.96.5.8/56648_tcp, state=Connected, pending=[---]}}}\n","stream":"stdout","time":"2021-11-01T10:22:42.069622043Z"}
{"log":"daemon_c67db375-4bc9-494d-8e9f-86b919b3677d.30000.000.trc: [1210][-1/-1/-1] 2021-11-01 10:22:39.371804 i Daemon           NetworkConnection.cpp(00271) : Closing
connection channel, state FINISHED {\u003cNetworkChannelSSLFilter\u003e={\u003cNetworkChannelBase\u003e={this=94919751505560, fd=13, refCnt=1, local=100.96.5.8/
30000_tcp, remote=100.96.5.8/56648_tcp, state=Connected, pending=[---]}}}\n","stream":"stdout","time":"2021-11-01T10:22:42.069631996Z"}
{"log":"daemon_c67db375-4bc9-494d-8e9f-86b919b3677d.30000.000.trc: [1210][-1/-1/-1] 2021-11-01 10:22:41.716337 i Daemon           Backint.cpp(00182) : Wait for backint pid 3439
returned 3439, status: 0\n","stream":"stdout","time":"2021-11-01T10:22:42.069639163Z"}
{"log":"daemon_c67db375-4bc9-494d-8e9f-86b919b3677d.30000.000.trc: [1210][-1/-1/-1] 2021-11-01 10:22:41.716357 i Daemon           DaemonHandle.cpp(00323) : Instance count 5.
Searching for terminated processes\n","stream":"stdout","time":"2021-11-01T10:22:42.069644113Z"}
{"log":"daemon_c67db375-4bc9-494d-8e9f-86b919b3677d.30000.000.trc: [1210][-1/-1/-1] 2021-11-01 10:22:41.716459 i Daemon           DaemonHandle.cpp(00443) : Process
'hdbcompileserver', pid 2153 is alive\n","stream":"stdout","time":"2021-11-01T10:22:42.069649207Z"}
{"log":"daemon_c67db375-4bc9-494d-8e9f-86b919b3677d.30000.000.trc: [1210][-1/-1/-1] 2021-11-01 10:22:41.716495 i Daemon           DaemonHandle.cpp(00443) : Process
'hdbnameserver', pid 1261 is alive\n","stream":"stdout","time":"2021-11-01T10:22:42.069654207Z"}
{"log":"daemon_c67db375-4bc9-494d-8e9f-86b919b3677d.30000.000.trc: [1210][-1/-1/-1] 2021-11-01 10:22:41.716526 i Daemon           DaemonHandle.cpp(00443) : Process
'hdbindexserver', pid 2344 is alive\n","stream":"stdout","time":"2021-11-01T10:22:42.069659226Z"}
{"log":"daemon_c67db375-4bc9-494d-8e9f-86b919b3677d.30000.000.trc: [1210][-1/-1/-1] 2021-11-01 10:22:41.716555 i Daemon           DaemonHandle.cpp(00443) : Process
'hdbdiserver', pid 3027 is alive\n","stream":"stdout","time":"2021-11-01T10:22:42.069674288Z"}
```

```
73619 i Daemon          NetworkConnection.cpp(00238) : Connection from 100.96.5.8/56714_tcp (pid 2937) over socket 13. Handled message ("wait for pid", sending 18 bytes back\
n","stream":"stdout","time":"2021-11-01T10:22:47.086053539Z"}
{"log":"daemon_c67db375-4bc9-494d-8e9f-86b919b3677d.30000.000.trc: [1210]i[-1]i[-1/-1] 2021-11-01 10:22:46.973781 i Daemon          NetworkListener.cpp(01021) : Finishing
connection channel {\u003cNetworkChannelSSLFilter\u003e={\u003cNetworkChannelBase\u003e={this=94919751954456, fd=13, refCnt=1, local=100.96.5.8/30000_tcp,
remote=100.96.5.8/56714_tcp, state=Connected, pending=[---]}}}\n","stream":"stdout","time":"2021-11-01T10:22:47.086060306Z"}
{"log":"daemon_c67db375-4bc9-494d-8e9f-86b919b3677d.30000.000.trc: [1210]i[-1]i[-1/-1] 2021-11-01 10:22:46.973810 i Daemon          NetworkListener.cpp(01036) : Closing
connection finished channel {\u003cNetworkChannelSSLFilter\u003e={\u003cNetworkChannelBase\u003e={this=94919751954456, fd=13, refCnt=1, local=100.96.5.8/30000_tcp,
remote=100.96.5.8/56714_tcp, state=Connected, pending=[---]}}}\n","stream":"stdout","time":"2021-11-01T10:22:47.086066736Z"}
{"log":"DB_H00/backup.log: 2021-11-01T10:22:47+00:00 P0002344   17cdb05b99b INFO   BACKUP    state of service: dpserver, c67db375-4bc9-494d-8e9f-86b919b3677d:30043,
volume: 3, BackupExecuteDataBackupFinished\n","stream":"stdout","time":"2021-11-01T10:22:47.415163857Z"}
{"log":"DB_H00/indexserver_c67db375-4bc9-494d-8e9f-86b919b3677d.30040.loads.000.trc: 1;2021-11-
01T10:22:47.819000+00:00;_SYS_STATISTICS;0;HOST_DELTA_MERGE_STATISTICS_BASE;149;0;:3;9;0;statement_id=8708733387555296,
statement_hash=16e54b070cdae88c08621b4d316d7a3a, transaction_id=208, statement_execution_id=8444335200888484, connection_id=202766, application_name=Embedded
Statistics Server, app_user=_SYS_STATISTICS, context_id=2355;\n","stream":"stdout","time":"2021-11-01T10:22:47.829849477Z"}
{"log":"DB_H00/indexserver_c67db375-4bc9-494d-8e9f-86b919b3677d.30040.loads.000.trc: Trusted certificate          : CN=LSS Common\n","stream":"stdout","time":"2021-11-01T10:22:47.829875406Z"}
{"log":"H00/lss_c67db375-4bc9-494d-8e9f-86b919b3677d.H00.000.trc: [2334]i[-1]i[-1/-1] 2021-11-01 10:22:47.295031 i RequestHandler  RequestHandler.cpp(00048) :
getCurrentKeyMetadata() took 83 us\n","stream":"stdout","time":"2021-11-01T10:22:47.998068904Z"}
{"log":"H00/lss_c67db375-4bc9-494d-8e9f-86b919b3677d.H00.000.trc: [2333]i[-1]i[-1/-1] 2021-11-01 10:22:47.346094 i RequestHandler  RequestHandler.cpp(00048) : getCurrentKey()
took 154 us\n","stream":"stdout","time":"2021-11-01T10:22:47.998073696Z"}
{"log":"H00/lss_c67db375-4bc9-494d-8e9f-86b919b3677d.H00.000.trc: [2319]i[-1]i[-1/-1] 2021-11-01 10:22:47.394319 i RequestHandler  RequestHandler.cpp(00048) :
getCurrentKeyMetadata() took 92 us\n","stream":"stdout","time":"2021-11-01T10:22:47.998077617Z"}
{"log":"H00/lss_c67db375-4bc9-494d-8e9f-86b919b3677d.H00.000.trc: [2320]i[-1]i[-1/-1] 2021-11-01 10:22:47.397133 i RequestHandler  RequestHandler.cpp(00048) :
getCurrentKeyMetadata() took 61 us\n","stream":"stdout","time":"2021-11-01T10:22:47.998081561Z"}
{"log":"DB_H00/indexserver_c67db375-4bc9-494d-8e9f-86b919b3677d.30040.loads.000.trc: 1;2021-11-
01T10:22:48.046000+00:00;_SYS_DI;0;CONTAINERS_;119;0;:3;3;0;statement_id=870903440352658, statement_hash=14fd12468245aba49e9ddaf6fcff2ee9, transaction_id=392,
statement_execution_id=8444335200888484, connection_id=202773, application_name=Embedded Statistics Server, app_user=_SYS_STATISTICS, context_id=3031;\                   900
n","stream":"stdout","time":"2021-11-01T10:22:48.049757177Z"}
{"log":"DB_H00/indexserver_c67db375-4bc9-494d-8e9f-86b919b3677d.30040.loads.000.trc: 1;2021-11-
01T10:22:48.052000+00:00;_SYS_STATISTICS;0;GLOBAL_CATALOG_CONSISTENCY_BASE;164;0;:3;3;0;statement_id=8444335200888485, connection_id=202768, application_name=Embedded
statement_hash=a51b5a8aaff2a2c8db21a43a113e709, transaction_id=147, statement_execution_id=8444335200888485, connection_id=202768, application_name=Embedded
Statistics Server, app_user=_SYS_STATISTICS, context_id=2768;\n","stream":"stdout","time":"2021-11-01T10:22:48.055333255Z"}
{"log":"DB_H00/indexserver_c67db375-4bc9-494d-8e9f-86b919b3677d.30040.loads.000.trc: \n","stream":"stdout","time":"2021-11-01T10:22:48.055354008Z"}
{"log":"DB_H00/indexserver_c67db375-4bc9-494d-8e9f-86b919b3677d.30040.loads.000.trc: \n","stream":"stdout","time":"2021-11-01T10:22:48.0557763723073,
{"log":"DB_H00/indexserver_c67db375-4bc9-494d-8e9f-86b919b3677d.30040.loads.000.trc: 1;2021-11-
01T10:22:48.797000+00:00;_SYS_STATISTICS;0;GLOBAL_ROWSTORE_TABLES_SIZE_BASE;87;0;:3;4;0;statement_id=870877633723073,
statement_hash=cab1f09c15893278403449062dafbb, transaction_id=454, statement_execution_id=8444335200888483, connection_id=202767, application_name=Embedded
Statistics Server, app_user=_SYS_STATISTICS, context_id=3431;\n","stream":"stdout","time":"2021-11-01T10:22:48.820005752"}
{"log":"DB_H00/indexserver_c67db375-4bc9-494d-8e9f-86b919b3677d.30040.loads.000.trc: \n","stream":"stdout","time":"2021-11-01T10:22:48.820029081Z"}
{"log":"DB_H00/indexserver_c67db375-4bc9-494d-8e9f-86b919b3677d.30040.loads.000.trc: 1;2021-11-
01T10:22:48.902000+00:00;_SYS_STATISTICS;0;HOST_SERVICE_COMPONENT_MEMORY_BASE;88;0;:3;3;0;statement_id=870881928690390,
statement_hash=0b1e9a5eac0448f621d1855270e2265b, transaction_id=28, statement_execution_id=8444335200888485, connection_id=202768, application_name=Embedded
Statistics Server, app_user=_SYS_STATISTICS, context_id=3433;\n","stream":"stdout","time":"2021-11-01T10:22:48.908872373Z"}
{"log":"DB_H00/backint.log: 2021-11-01 10:22:48.911 backint terminated:\n","stream":"stdout","time":"2021-11-01T10:22:48.919362838Z"}
```

{"log":"DB_H00/backint.log:    pid: 3456\n","stream":"stdout","time":"2021-11-01T10:22:48.912157836Z"}
{"log":"DB_H00/backint.log:    exit code: 0\n","stream":"stdout","time":"2021-11-01T10:22:48.912323277Z"}
{"log":"DB_H00/backint.log:    output:\n","stream":"stdout","time":"2021-11-01T10:22:48.912488631Z"}
{"log":"DB_H00/backint.log: [2021-11-01 10:22:43,491] - 3462 MainThread - backup_store:82 - INFO - Start backup of: /usr/sap/H00/SYS/global/hdb/backint/DB_H00/initial_databackup_2_1 -\u003e Key: c67db375-4bc9-494d-8e9f-86b919b3677d/DB_H00/initial_databackup_2_1\n","stream":"stdout","time":"2021-11-01T10:22:48.912652311Z"}
{"log":"DB_H00/backint.log: #SOFTWAREID \"backint 1.06\"\"SAP Backint for Object Store 0.0.1\"\n","stream":"stdout","time":"2021-11-01T10:22:48.912786976Z"}
{"log":"DB_H00/backint.log: #SAVED Yi_Nz6kTmtwelvJQ.yb_e6ejumSF1e4S /usr/sap/H00/SYS/global/hdb/backint/DB_H00/initial_databackup_2_1 151019520\n","stream":"stdout","time":"2021-11-01T10:22:48.912941256Z"}
{"log":"DB_H00/backint.log: metrics: source: 151019520, destination: 151019520, seconds: 5.322376251220703\n","stream":"stdout","time":"2021-11-01T10:22:48.913195388Z"}
{"log":"DB_H00/indexserver_c67db375-4bc9-494d-8e9f-86b919b3677d.30040.loads.000.trc: 1;2021-11-01T10:22:48.920000+00:00;_SYS_STATISTICS;0;HOST_SERVICE_MEMORY_BASE;89;0;;3;7;0;statement_id=87086904378851Z,statement_hash=bce2e1b3f2ae748d9b3b11ccea5c6cfd,transaction_id=393,statement_execution_id=8444335200088486,connection_id=202765,application_name=Embedded Statistics Server, app_user=_SYS_STATISTICS, context_id=3434;\n","stream":"stdout","time":"2021-11-01T10:22:48.929075415Z"}
{"log":"DB_H00/indexserver_c67db375-4bc9-494d-8e9f-86b919b3677d.30040.loads.000.trc: \n","stream":"stdout","time":"2021-11-01T10:22:48.929098764Z"}
{"log":"DB_H00/indexserver_c67db375-4bc9-494d-8e9f-86b919b3677d.30040.loads.000.trc: 1;2021-11-01T10:22:49.012000+00:00;_SYS_STATISTICS;0;HOST_SERVICE_STATISTICS_BASE;90;0;;3;4;0;statement_id=8708776337231Z2,statement_hash=4c470a01be7e6aa54aa91dfb19c33ade,transaction_id=147,statement_execution_id=8444335200088483,connection_id=202767,application_name=Embedded Statistics Server, app_user=_SYS_STATISTICS, context_id=3431;\n","stream":"stdout","time":"2021-11-01T10:22:49.018418863Z"}
{"log":"DB_H00/indexserver_c67db375-4bc9-494d-8e9f-86b919b3677d.30040.loads.000.trc: \n","stream":"stdout","time":"2021-11-01T10:22:49.018644454Z"}
{"log":"DB_H00/indexserver_c67db375-4bc9-494d-8e9f-86b919b3677d.30040.loads.000.trc: 1;2021-11-01T10:22:49.044000+00:00;_SYS_STATISTICS;0;HOST_RESOURCE_UTILIZATION_STATISTICS_BASE;91;0;;3;4;0;statement_id=87088622365773Z0,statement_hash=fe5a7123be97153591d197637b0ab0c0,transaction_id=208,statement_execution_id=8444335200088482,connection_id=202769,application_name=Embedded Statistics Server, app_user=_SYS_STATISTICS, context_id=3430;\n","stream":"stdout","time":"2021-11-01T10:22:49.048870191Z"}
{"log":"DB_H00/indexserver_c67db375-4bc9-494d-8e9f-86b919b3677d.30040.loads.000.trc: \n","stream":"stdout","time":"2021-11-01T10:22:49.049176131Z"}
{"log":"DB_H00/indexserver_c67db375-4bc9-494d-8e9f-86b919b3677d.30040.loads.000.trc: 1;2021-11-01T10:22:49.078000+00:00;_SYS_STATISTICS;0;HOST_HEAP_ALLOCATORS_BASE;92;0;;3;8;0;statement_id=87086904378856Z0,statement_hash=fbd7dfde2eb7e0273c496c74b34869a4,transaction_id=71,statement_execution_id=8444335200088486,connection_id=202765,application_name=Embedded Statistics Server, app_user=_SYS_STATISTICS, context_id=3434;\n","stream":"stdout","time":"2021-11-01T10:22:49.086811505Z"}
{"log":"DB_H00/indexserver_c67db375-4bc9-494d-8e9f-86b919b3677d.30040.loads.000.trc: \n","stream":"stdout","time":"2021-11-01T10:22:49.086840679Z"}
{"log":"DB_H00/indexserver_c67db375-4bc9-494d-8e9f-86b919b3677d.30040.loads.000.trc: 1;2021-11-01T10:22:49.083000+00:00;_SYS_STATISTICS;0;HOST_COLUMN_TABLES_PART_SIZE_BASE;93;0;;3;7;0;statement_id=87088192869045Z8,statement_hash=9c93b5e492c593692a1784e68025d37c,transaction_id=454,statement_execution_id=8444335200088485,connection_id=202768,application_name=Embedded Statistics Server, app_user=_SYS_STATISTICS, context_id=3433;\n","stream":"stdout","time":"2021-11-01T10:22:49.090651747Z"}
{"log":"DB_H00/indexserver_c67db375-4bc9-494d-8e9f-86b919b3677d.30040.loads.000.trc: \n","stream":"stdout","time":"2021-11-01T10:22:49.090833991Z"}
{"log":"DB_H00/indexserver_c67db375-4bc9-494d-8e9f-86b919b3677d.30040.loads.000.trc: 1;2021-11-01T10:22:49.085000+00:00;_SYS_STATISTICS;0;GLOBAL_DISKS_BASE;125;0;;3;7;0;statement_id=8708776337231Z2,statement_hash=704e81abba6e30f481954f3e97b58dab,transaction_id=435,statement_execution_id=8444335200088483,connection_id=202767,application_name=Embedded Statistics Server, app_user=_SYS_STATISTICS, context_id=3431;\n","stream":"stdout","time":"2021-11-01T10:22:49.092783255Z"}
{"log":"DB_H00/indexserver_c67db375-4bc9-494d-8e9f-86b919b3677d.30040.loads.000.trc: \n","stream":"stdout","time":"2021-11-01T10:22:49.092935447Z"}

{"log":"DB_H00/indexserver_c67db375-4bc9-494d-8e9f-86b919b3677d.30040.loads.000.trc: 1;2021-11-01T10:22:49.162000+00:00;_SYS_STATISTICS;0;GLOBAL_TABLE_PERSISTENCE_STATISTICS_BASE;126;0;;3;4;0;statement_id=8708862236577780, statement_hash=ad982228d1634fcba908f0c112b905935d, transaction_id=28, statement_execution_id=8444335520088482, connection_id=202769, application_name=Embedded Statistics Server, app_user=_SYS_STATISTICS, context_id=3430;\n","stream":"stdout","time":"2021-11-01T10:22:49.167429837Z"}
{"log":"DB_H00/indexserver_c67db375-4bc9-494d-8e9f-86b919b3677d.30040.loads.000.trc: 1;2021-11-01T10:22:49.167710132Z"}
{"log":"DB_H00/indexserver_c67db375-4bc9-494d-8e9f-86b919b3677d.30040.loads.000.trc: 1;2021-11-01T10:22:49.192000+00:00;_SYS_STATISTICS;0;GLOBAL_PERSISTENCE_STATISTICS_BASE;127;0;;3;2;0;statement_id=8708690437888619, statement_hash=ce3d04eb13bf2b9279dab4aea09b67af, transaction_id=147, statement_execution_id=8444335520088486, connection_id=202765, application_name=Embedded Statistics Server, app_user=_SYS_STATISTICS, context_id=3434;\n","stream":"stdout","time":"2021-11-01T10:22:49.194930457Z"}
{"log":"DB_H00/indexserver_c67db375-4bc9-494d-8e9f-86b919b3677d.30040.loads.000.trc: 1;2021-11-01T10:22:49.194962602Z"}
{"log":"DB_H00/indexserver_c67db375-4bc9-494d-8e9f-86b919b3677d.30040.loads.000.trc: 1;2021-11-01T10:22:49.193000+00:00;_SYS_STATISTICS;0;HOST_VOLUME_FILES_BASE;128;0;;3;3;0;statement_id=8708776337232212, statement_hash=6c97eb8d1b7738b131df9a22c522d70, transaction_id=71, statement_execution_id=8444335520088483, connection_id=202767, application_name=Embedded Statistics Server, app_user=_SYS_STATISTICS, context_id=3431;\n","stream":"stdout","time":"2021-11-01T10:22:49.196495581Z"}
{"log":"DB_H00/indexserver_c67db375-4bc9-494d-8e9f-86b919b3677d.30040.loads.000.trc: 1;2021-11-01T10:22:49.196528697Z"}
{"log":"DB_H00/indexserver_c67db375-4bc9-494d-8e9f-86b919b3677d.30040.loads.000.trc: 1;2021-11-01T10:22:49.273000+00:00;_SYS_STATISTICS;0;HOST_DATA_VOLUME_PAGE_STATISTICS_BASE;129;0;;3;4;0;statement_id=8708819286590524, statement_hash=04ce65a9dd3b38ecf216dc4d63e77a97, transaction_id=454, statement_execution_id=8444335520088485, connection_id=202768, application_name=Embedded Statistics Server, app_user=_SYS_STATISTICS, context_id=3433;\n","stream":"stdout","time":"2021-11-01T10:22:49.274450662Z"}
{"log":"DB_H00/indexserver_c67db375-4bc9-494d-8e9f-86b919b3677d.30040.loads.000.trc: 1;2021-11-01T10:22:49.277000+00:00;_SYS_STATISTICS;0;HOST_SAVEPOINTS_BASE;130;0;;3;5;0;statement_id=8708776337232388, statement_hash=0d4e1f287c4a77e762fa08dd8cc6b7ed, transaction_id=258, statement_execution_id=8444335520088483, connection_id=202767, application_name=Embedded Statistics Server, app_user=_SYS_STATISTICS, context_id=3431;\n","stream":"stdout","time":"2021-11-01T10:22:49.282420926Z"}
{"log":"DB_H00/indexserver_c67db375-4bc9-494d-8e9f-86b919b3677d.30040.loads.000.trc: 1;2021-11-01T10:22:49.282441503Z"} ← 900
{"log":"DB_H00/indexserver_c67db375-4bc9-494d-8e9f-86b919b3677d.30040.loads.000.trc: 1;2021-11-01T10:22:49.282441503Z","stream":"stdout","state of service: indexserver, c67db375-4bc9-494d-8e9f-86b919b3677d:30040, volume: 2, BackupExecuteDataBackupFinished\n","stream":"stdout","time":"2021-11-01T10:22:49.312317544Z"}
{"log":"DB_H00/backup.log: 2021-11-01T10:22:49+00:00 P00002344  17cdb05b99b INFO  BACKUP  LOGBCKUP state of service: indexserver, c67db375-4bc9-494d-8e9f-86b919b3677d:30040, volume: 0, BackupExecuteCatalogBackupInProgress\n","stream":"stdout","time":"2021-11-01T10:22:49.315339757Z"}
{"log":"DB_H00/backup.log: 2021-11-01T10:22:49+00:00 P00002344  17cdb05e5e2 INFO  LOGBCKUP LOGBCKUP to backint: /usr/sap/H00/SYS/global/hdb/backint/DB_H00/log_backup_0_0_0_0\n","stream":"stdout","time":"2021-11-01T10:22:49.315568343Z"}
{"log":"DB_H00/indexserver_c67db375-4bc9-494d-8e9f-86b919b3677d.30040.loads.000.trc: 1;2021-11-01T10:22:49.322000+00:00;_SYS_STATISTICS;0;HOST_VOLUME_IO_DETAILED_STATISTICS_BASE;131;0;;3;7;0;statement_id=8708690437888660, statement_hash=46f6a9da243bda01482ef53d477bc6ac, transaction_id=444, statement_execution_id=8444335520088486, connection_id=202765, application_name=Embedded Statistics Server, app_user=_SYS_STATISTICS, context_id=3434;\n","stream":"stdout","time":"2021-11-01T10:22:49.329792105Z"}
{"log":"DB_H00/indexserver_c67db375-4bc9-494d-8e9f-86b919b3677d.30040.loads.000.trc: 1;2021-11-01T10:22:49.329820222Z"}
{"log":"daemon_c67db375-4bc9-494d-8e9f-86b919b3677d.30000.000.trc: [1210][-1][-1/-1] 2021-11-01 10:22:46.973815 i Daemon    NetworkConnection.cpp(00271) : Closing connection channel, state FINISHED {\u003cNetworkChannelSSLFilter\u003e=(this=9491975195445, fd=13, refCnt=1, local=100.96.5.8/30000_tcp, remote=100.96.5.8/56714_tcp, state=Connected, pending=[---]}};\n","stream":"stdout","time":"2021-11-01T10:22:49.338648235Z"}
{"log":"daemon_c67db375-4bc9-494d-8e9f-86b919b3677d.30000.000.trc: [1210][-1][-1/-1] 2021-11-01 10:22:48.891361 i Daemon    Backint.cpp(00182) : Wait for backint pid 3456 returned 3456, status: 0\n","stream":"stdout","time":"2021-11-01T10:22:49.338673322Z"}
{"log":"daemon_c67db375-4bc9-494d-8e9f-86b919b3677d.30000.000.trc: [1210][-1][-1/-1] 2021-11-01 10:22:48.891396 i Daemon    DaemonHandle.cpp(00323) : Instance count 5. Searching for terminated processes\n","stream":"stdout","time":"2021-11-01T10:22:49.338677785Z"}

{"log":"daemon_c67db375-4bc9-494d-8e9f-86b919b3677d.30000.000.trc: [1210]{-1}{-1/-1} 2021-11-01 10:22:48.891489 i Daemon           DaemonHandle.cpp(00443) : Process 'hdbcompileserver', pid 2153 is alive\n", "stream":"stdout", "time":"2021-11-01T10:22:49.338682257Z"}
{"log":"daemon_c67db375-4bc9-494d-8e9f-86b919b3677d.30000.000.trc: [1210]{-1}{-1/-1} 2021-11-01 10:22:48.891537 i Daemon           DaemonHandle.cpp(00443) : Process 'hdbnameserver', pid 1261 is alive\n", "stream":"stdout", "time":"2021-11-01T10:22:49.338697837"}
{"log":"daemon_c67db375-4bc9-494d-8e9f-86b919b3677d.30000.000.trc: [1210]{-1}{-1/-1} 2021-11-01 10:22:48.891580 i Daemon           DaemonHandle.cpp(00443) : Process 'hdbindexserver', pid 2344 is alive\n", "stream":"stdout", "time":"2021-11-01T10:22:49.338702954Z"}
{"log":"daemon_c67db375-4bc9-494d-8e9f-86b919b3677d.30000.000.trc: [1210]{-1}{-1/-1} 2021-11-01 10:22:48.891622 i Daemon           DaemonHandle.cpp(00443) : Process 'hdbdiserver', pid 3027 is alive\n", "stream":"stdout", "time":"2021-11-01T10:22:49.338706534Z"}
{"log":"daemon_c67db375-4bc9-494d-8e9f-86b919b3677d.30000.000.trc: [1210]{-1}{-1/-1} 2021-11-01 10:22:48.891663 i Daemon           DaemonHandle.cpp(00443) : Process 'hdbdpserver', pid 2937 is alive\n", "stream":"stdout", "time":"2021-11-01T10:22:49.338709948Z"}
{"log":"daemon_c67db375-4bc9-494d-8e9f-86b919b3677d.30000.000.trc: [1210]{-1}{-1/-1} 2021-11-01 10:22:48.891680 i Daemon           Daemon.cpp(01059) : Daemon state \"running\", runlevels [current:reached:target]=[5:5:5]\n", "stream":"stdout", "time":"2021-11-01T10:22:49.338713502Z"}
{"log":"daemon_c67db375-4bc9-494d-8e9f-86b919b3677d.30000.000.trc: [1210]{-1}{-1/-1} 2021-11-01 10:22:48.891745 i Daemon           Daemon.cpp(00152) : Shared memory updated, no daemon state change\n", "stream":"stdout", "time":"2021-11-01T10:22:49.338717862Z"}
{"log":"daemon_c67db375-4bc9-494d-8e9f-86b919b3677d.30000.000.trc: [1210]{-1}{-1/-1} 2021-11-01 10:22:48.909961 i Daemon           NetworkListener.cpp(01096) : New connection accepted from 100.96.5.8/56736_tcp over socket 13\n", "stream":"stdout", "time":"2021-11-01T10:22:49.338721296Z"}
{"log":"daemon_c67db375-4bc9-494d-8e9f-86b919b3677d.30000.000.trc: [1210]{-1}{-1/-1} 2021-11-01 10:22:48.910214 i Daemon           NetworkConnection.cpp(00226) : Connection from 100.96.5.8/56736_tcp (pid 2344) over socket 13. Process 'hdbindexserver'. Received message \"wait for pid\"\n", "stream":"stdout", "time":"2021-11-01T10:22:49.338870972Z"}
{"log":"daemon_c67db375-4bc9-494d-8e9f-86b919b3677d.30000.000.trc: [1210]{-1}{-1/-1} 2021-11-01 10:22:48.910221 i Daemon           NetworkConnection.cpp(00238) : Connection from 100.96.5.8/56736_tcp (pid 2344) over socket 13. Handled message \"wait for pid\", sending 18 bytes back\n", "stream":"stdout", "time":"2021-11-01T10:22:49.338886599Z"}
{"log":"daemon_c67db375-4bc9-494d-8e9f-86b919b3677d.30000.000.trc: [1210]{-1}{-1/-1} 2021-11-01 10:22:48.910260 i Daemon           NetworkListener.cpp(01021) : Finishing connection channel {\u003cNetworkChannelSSLFilter\u003e={\u003cNetworkChannelBase\u003e={this=949197519544456, fd=13, refCnt=1, local=100.96.5.8/30000_tcp, remote=100.96.5.8/56736_tcp, state=Connected, pending=[--]}}\n", "stream":"stdout", "time":"2021-11-01T10:22:49.338892025Z"}
{"log":"daemon_c67db375-4bc9-494d-8e9f-86b919b3677d.30000.000.trc: [1210]{-1}{-1/-1} 2021-11-01 10:22:48.910272 i Daemon           NetworkListener.cpp(01036) : Closing connection finished channel {\u003cNetworkChannelSSLFilter\u003e={\u003cNetworkChannelBase\u003e={this=949197519544456, fd=13, refCnt=1, local=100.96.5.8/30000_tcp, remote=100.96.5.8/56736_tcp, state=Connected, pending=[--]}}\n", "stream":"stdout", "time":"2021-11-01T10:22:49.338984192Z"}
{"log":"daemon_c67db375-4bc9-494d-8e9f-86b919b3677d.30000.000.trc: [1210]{-1}{-1/-1} 2021-11-01 10:22:48.910274 i Daemon           NetworkConnection.cpp(00271) : Closing connection channel, state FINISHED {\u003cNetworkChannelSSLFilter\u003e={\u003cNetworkChannelBase\u003e={this=949197519544456, fd=13, refCnt=1, local=100.96.5.8/30000_tcp, remote=100.96.5.8/56736_tcp, state=Connected, pending=[--]}}\n", "stream":"stdout", "time":"2021-11-01T10:22:49.338904078Z"}
{"log":"daemon_c67db375-4bc9-494d-8e9f-86b919b3677d.30000.000.trc: [1210]{-1}{-1/-1} 2021-11-01 10:22:49.337292 i Daemon           NetworkListener.cpp(01096) : New connection accepted from 100.96.5.8/56738_tcp over socket 13\n", "stream":"stdout", "time":"2021-11-01T10:22:49.338920685Z"}
{"log":"daemon_c67db375-4bc9-494d-8e9f-86b919b3677d.30000.000.trc: [1210]{-1}{-1/-1} 2021-11-01 10:22:49.337537 i Daemon           NetworkConnection.cpp(00226) : Connection from 100.96.5.8/56738_tcp (pid 2344) over socket 13. Process 'hdbindexserver'. Received message \"execute backint\"\n", "stream":"stdout", "time":"2021-11-01T10:22:49.349650351Z"}
{"log":"DB_H00/backint.log: 2021-11-01 10:22:49.348 backint started:\n", "stream":"stdout", "time":"2021-11-01T10:22:49.349653949Z"}
{"log":"DB_H00/backint.log:   command: /usr/sap/H00/SYS/global/hdb/backint/DB_H00/log_backup_0_0_0_0\n", "stream":"stdout", "time":"2021-11-01T10:22:49.350543949Z"}
{"log":"DB_H00/backint.log:   #PIPE \"/usr/sap/H00/SYS/global/hdb/backint/DB_H00/log_backup_0_0_0_0\"\n", "stream":"stdout", "time":"2021-11-01T10:22:49.350543949Z"}
{"log":"daemon_c67db375-4bc9-494d-8e9f-86b919b3677d.30000.000.trc: [1210]{-1}{-1/-1} 2021-11-01 10:22:49.337594 i Daemon           Utilities.cpp(00190) : The executable '/usr/sap/H00/SYS/global/hdb/opt/hdbbackint' is symlink to 'CURRENT/hdbbackint/hdbbackint'\n", "stream":"stdout", "time":"2021-11-01T10:22:49.351544208Z"}
{"log":"daemon_c67db375-4bc9-494d-8e9f-86b919b3677d.30000.000.trc: [1210]{-1}{-1/-1} 2021-11-01 10:22:49.344745 i Daemon           NetworkConnection.cpp(00271) : Closing connection channel, state READING {\u003cNetworkChannelSSLFilter\u003e={\u003cNetworkChannelBase\u003e={this=949197519544456, fd=13, refCnt=1, local=100.96.5.8/30000_tcp, remote=100.96.5.8/56738_tcp, state=Connected, pending=[--]}}\n", "stream":"stdout", "time":"2021-11-01T10:22:49.351678953Z"}
{"log":"daemon_c67db375-4bc9-494d-8e9f-86b919b3677d.30000.000.trc: [1210]{-1}{-1/-1} 2021-11-01 10:22:49.349789 w Environment     NetworkListener.cpp(00960) : Child process deletes daemon port\n", "stream":"stdout", "time":"2021-11-01T10:22:49.351849974Z"}

{"log":"DB_H00/indexserver_c67db375-4bc9-494d-8e9f-86b919b3677d.30040.loads.000.trc: 1;2021-11-01T10:22:50.482000+00:00;_SYS_STATISTICS;0;HOST_SERVICE_REPLICATION_BASE;155;0;;3;14;0;statement_id=87087763723524, statement_hash=bdc1535ec9b1990e4826ec4abced2ae3, transaction_id=407, statement_execution_id=8444335200088483, connection_id=202767, application_name=Embedded Statistics Server, app_user=_SYS_STATISTICS, context_id=3431;\n","stream":"stdout","time":"2021-11-01T10:22:50.496827229Z"}
{"log":"DB_H00/indexserver_c67db375-4bc9-494d-8e9f-86b919b3677d.30040.loads.000.trc: \n","stream":"stdout","time":"2021-11-01T10:22:50.496866105Z"}
{"log":"DB_H00/indexserver_c67db375-4bc9-494d-8e9f-86b919b3677d.30040.loads.000.trc: 1;2021-11-01T10:22:50.517000+00:00;_SYS_STATISTICS;0;HOST_JOB_HISTORY_BASE;157;0;;3;4;0;statement_id=87088192869 0838, statement_hash=95ec6b93f0024482d1559315f3f5b9d1, transaction_id=444, statement_execution_id=8444335200088485, connection_id=202768, application_name=Embedded Statistics Server, app_user=_SYS_STATISTICS, context_id=3433;\n","stream":"stdout","time":"2021-11-01T10:22:50.521932367Z"}
{"log":"DB_H00/indexserver_c67db375-4bc9-494d-8e9f-86b919b3677d.30040.loads.000.trc: 1;2021-11-01T10:22:50.540000+00:00;_SYS_STATISTICS;0;HOST_LOAD_HISTORY_HOST_BASE;158;0;;3;4;0;statement_execution_id=8444335200088482, connection_id=202769, application_name=Embedded Statistics Server, app_user=_SYS_STATISTICS, context_id=3430;\n","stream":"stdout","time":"2021-11-01T10:22:50.521958 4Z"}
{"log":"DB_H00/indexserver_c67db375-4bc9-494d-8e9f-86b919b3677d.30040.loads.000.trc: 1;2021-11-01T10:22:50.540000+00:00;_SYS_STATISTICS;0;HOST_LOAD_HISTORY_HOST_BASE;158;0;;3;4;0;statement_id=87088622365 8150, statement_hash=f4561d9451d663ffa89d856e3b5c45f2, transaction_id=28, statement_execution_id=8444335200088482, connection_id=202769, application_name=Embedded Statistics Server, app_user=_SYS_STATISTICS, context_id=3430;\n","stream":"stdout","time":"2021-11-01T10:22:50.549130275Z"}
{"log":"DB_H00/indexserver_c67db375-4bc9-494d-8e9f-86b919b3677d.30040.loads.000.trc: 1;2021-11-01T10:22:50.569000+00:00;_SYS_STATISTICS;0;HOST_LOAD_HISTORY_SERVICE_BASE;159;0;;3;9;0;statement_id=870869043788979, statement_hash=1ec2c123b6df5492b6dfc6c748099dee, transaction_id=453, statement_execution_id=8444335200088486, connection_id=202765, application_name=Embedded Statistics Server, app_user=_SYS_STATISTICS, context_id=3434;\n","stream":"stdout","time":"2021-11-01T10:22:50.582357931Z"}
{"log":"DB_H00/indexserver_c67db375-4bc9-494d-8e9f-86b919b3677d.30040.loads.000.trc: 1;2021-11-01T10:22:50.595000+00:00;_SYS_STATISTICS;0;HOST_SERVICE_THREAD_SAMPLES_STATEMENTS_BASE;160;0;;3;5;0;statement_id=87087763723587, statement_hash=5f82b107536d1eb544ad86ea2a6fc1f0d, transaction_id=469, statement_execution_id=8444335200088483, connection_id=202767, application_name=Embedded Statistics Server, app_user=_SYS_STATISTICS, context_id=3431;\n","stream":"stdout","time":"2021-11-01T10:22:50.601617863Z"}
{"log":"DB_H00/indexserver_c67db375-4bc9-494d-8e9f-86b919b3677d.30040.loads.000.trc: 1;2021-11-01T10:22:50.641000+00:00;_SYS_STATISTICS;0;HOST_CS_LOB_SPACE_RECLAIMS_BASE;161;0;;3;7;0;statement_id=87088622365 8192, statement_hash=7a5cbf147d8d473279e39ba6db82ef0, transaction_id=276, statement_execution_id=8444335200088482, connection_id=202769, application_name=Embedded Statistics Server, app_user=_SYS_STATISTICS, context_id=3430;\n","stream":"stdout","time":"2021-11-01T10:22:50.649677818Z"}
{"log":"DB_H00/indexserver_c67db375-4bc9-494d-8e9f-86b919b3677d.30040.loads.000.trc: 1;2021-11-01T10:22:50.675000+00:00;_SYS_STATISTICS;0;GLOBAL_OUT_OF_MEMORY_EVENTS_BASE;162;0;;3;3;0;statement_id=87088192869 0908, statement_hash=18d60d617a3e218feb5377235ac9ca0e, transaction_id=145, statement_execution_id=8444335200088485, connection_id=202768, application_name=Embedded Statistics Server, app_user=_SYS_STATISTICS, context_id=3433;\n","stream":"stdout","time":"2021-11-01T10:22:50.682342528Z"}

```
{"log":"SYSTEMDB/lss_c67db375-4bc9-494d-8e9f-86b919b3677d.SYSTEMDB.000.trc: [810][-1][-1/-1] 2021-11-01 10:22:53.930594 i Persistence        CryptoDBReadLockedImpl.cpp(00024) : ConfigDB \u003e CryptoDBReadLockedImpl: trying to get write lock\n","stream":"stdout","time":"2021-11-01T10:22:54.442812365Z"}
{"log":"SYSTEMDB/lss_c67db375-4bc9-494d-8e9f-86b919b3677d.SYSTEMDB.000.trc: [810][-1][-1/-1] 2021-11-01 10:22:53.930646 i Persistence        CryptoDBReadLockedImpl.cpp(00028) : ConfigDB \u003e CryptoDBReadLockedImpl: have write lock\n","stream":"stdout","time":"2021-11-01T10:22:54.442816571Z"}
{"log":"SYSTEMDB/lss_c67db375-4bc9-494d-8e9f-86b919b3677d.SYSTEMDB.000.trc: [810][-1][-1/-1] 2021-11-01 10:22:53.933621 i Persistence        PersistenceImpl.cpp(00339) : ConfigDB \u003e Revision is:  09000000000000000 00000000000000000 setContent new\n","stream":"stdout","time":"2021-11-01T10:22:54.442821303Z"}
{"log":"SYSTEMDB/lss_c67db375-4bc9-494d-8e9f-86b919b3677d.SYSTEMDB.000.trc: [810][-1][-1/-1] 2021-11-01 10:22:53.934965 i Persistence        CryptoDBReadLockedImpl.cpp(00040) : ConfigDB \u003e CryptoDBReadLockedImpl: release write lock\n","stream":"stdout","time":"2021-11-01T10:22:54.442828013Z"}
{"log":"SYSTEMDB/lss_c67db375-4bc9-494d-8e9f-86b919b3677d.SYSTEMDB.000.trc: [810][-1][-1/-1] 2021-11-01 10:22:53.934973 i Persistence        CryptoDBWriteImpl.hpp(00099) : ConfigDB \u003e CryptoDBWriteImpl: after commit 9\n","stream":"stdout","time":"2021-11-01T10:22:54.442832015Z"}
{"log":"SYSTEMDB/lss_c67db375-4bc9-494d-8e9f-86b919b3677d.SYSTEMDB.000.trc: [810][-1][-1/-1] 2021-11-01 10:22:53.936160 i Persistence        PersistenceImpl.cpp(00339) : PayloadDB \u003e Revision is:  16000000000000000 00000000000000000 setContent new\n","stream":"stdout","time":"2021-11-01T10:22:54.442835582Z"}
{"log":"SYSTEMDB/lss_c67db375-4bc9-494d-8e9f-86b919b3677d.SYSTEMDB.000.trc: [810][-1][-1/-1] 2021-11-01 10:22:53.937348 i Persistence        CryptoDBWriteImpl.hpp(00099) : PayloadDB \u003e CryptoDBWriteImpl: after commit 22\n","stream":"stdout","time":"2021-11-01T10:22:54.442878642Z"}
{"log":"SYSTEMDB/lss_c67db375-4bc9-494d-8e9f-86b919b3677d.SYSTEMDB.000.trc: [810][-1][-1/-1] 2021-11-01 10:22:53.937355 i Persistence        CryptoDBWriteImpl.hpp(00099) : PayloadDB \u003e CryptoDBWriteImpl: after commit 22\n","stream":"stdout","time":"2021-11-01T10:22:54.442882606Z"}
{"log":"SYSTEMDB/lss_c67db375-4bc9-494d-8e9f-86b919b3677d.SYSTEMDB.000.trc: [810][-1][-1/-1] 2021-11-01 10:22:53.937395 e Crypto             Provider.cpp(00105) : Wrong Provider!\n","stream":"stdout","time":"2021-11-01T10:22:54.442885769Z"}
{"log":"SYSTEMDB/lss_c67db375-4bc9-494d-8e9f-86b919b3677d.SYSTEMDB.000.trc: [810][-1][-1/-1] 2021-11-01 10:22:53.961378 i Persistence        CryptoDBReadLockedImpl.cpp(00024) : ConfigDB \u003e CryptoDBReadLockedImpl: trying to get write lock\n","stream":"stdout","time":"2021-11-01T10:22:54.442888814Z"}
{"log":"SYSTEMDB/lss_c67db375-4bc9-494d-8e9f-86b919b3677d.SYSTEMDB.000.trc: [810][-1][-1/-1] 2021-11-01 10:22:53.961466 i Persistence        CryptoDBReadLockedImpl.cpp(00028) : ConfigDB \u003e CryptoDBReadLockedImpl: have write lock\n","stream":"stdout","time":"2021-11-01T10:22:54.442890625Z"}
{"log":"SYSTEMDB/lss_c67db375-4bc9-494d-8e9f-86b919b3677d.SYSTEMDB.000.trc: [810][-1][-1/-1] 2021-11-01 10:22:53.962765 i Persistence        PersistenceImpl.cpp(00339) : ConfigDB \u003e Revision is:  0a00000000000000 00000000000000000 setContent new\n","stream":"stdout","time":"2021-11-01T10:22:54.442893314Z"}
{"log":"SYSTEMDB/lss_c67db375-4bc9-494d-8e9f-86b919b3677d.SYSTEMDB.000.trc: [810][-1][-1/-1] 2021-11-01 10:22:53.964101 i Persistence        CryptoDBReadLockedImpl.cpp(00040) : ConfigDB \u003e CryptoDBReadLockedImpl: release write lock\n","stream":"stdout","time":"2021-11-01T10:22:54.442895596Z"}
{"log":"SYSTEMDB/lss_c67db375-4bc9-494d-8e9f-86b919b3677d.SYSTEMDB.000.trc: [810][-1][-1/-1] 2021-11-01 10:22:53.964107 i Persistence        CryptoDBWriteImpl.hpp(00099) : ConfigDB \u003e CryptoDBWriteImpl: after commit 10\n","stream":"stdout","time":"2021-11-01T10:22:54.442898016Z"}
{"log":"SYSTEMDB/lss_c67db375-4bc9-494d-8e9f-86b919b3677d.SYSTEMDB.000.trc: [810][-1][-1/-1] 2021-11-01 10:22:53.964114 i Persistence        CryptoDBReadLockedImpl.cpp(00024) : PayloadDB \u003e CryptoDBReadLockedImpl: trying to get write lock\n","stream":"stdout","time":"2021-11-01T10:22:54.442900514Z"}
{"log":"SYSTEMDB/lss_c67db375-4bc9-494d-8e9f-86b919b3677d.SYSTEMDB.000.trc: [810][-1][-1/-1] 2021-11-01 10:22:53.964157 i Persistence        CryptoDBReadLockedImpl.cpp(00028) : PayloadDB \u003e CryptoDBReadLockedImpl: have write lock\n","stream":"stdout","time":"2021-11-01T10:22:54.442903022Z"}
{"log":"SYSTEMDB/lss_c67db375-4bc9-494d-8e9f-86b919b3677d.SYSTEMDB.000.trc: [810][-1][-1/-1] 2021-11-01 10:22:53.965335 i Persistence        PersistenceImpl.cpp(00339) : PayloadDB \u003e Revision is:  17000000000000000 00000000000000000 setContent new\n","stream":"stdout","time":"2021-11-01T10:22:54.442905462Z"}
{"log":"SYSTEMDB/lss_c67db375-4bc9-494d-8e9f-86b919b3677d.SYSTEMDB.000.trc: [810][-1][-1/-1] 2021-11-01 10:22:53.966610 i Persistence        CryptoDBReadLockedImpl.cpp(00040) : PayloadDB \u003e CryptoDBReadLockedImpl: release write lock\n","stream":"stdout","time":"2021-11-01T10:22:54.442908314Z"}
```

{"log":"SYSTEMDB/lss_c67db375-4bc9-494d-8e9f-86b919b3677d/SYSTEMDB.000.trc: [810][-1][-1/-1] 2021-11-01 10:22:53.966616 i Persistence          CryptoDBWriteImpl.hpp(00099) : PayloadDB \u003e CryptoDBWriteImpl: after commit 23\n","stream":"stdout","time":"2021-11-01T10:22:54.442910791Z"}
{"log":"nameserver_c67db375-4bc9-494d-8e9f-86b919b3677d.30001.000.trc: [2116][102816][422/444408833] 2021-11-01 10:22:32.020178 i RootKeyManager  RootKeyManagerLss.cpp(00823) : Successfully set secure store backup password\n","stream":"stdout","time":"2021-11-01T10:22:54.927207345Z"}
{"log":"nameserver_c67db375-4bc9-494d-8e9f-86b919b3677d.30001.000.trc: [3522][102846][362/-1] 2021-11-01 10:22:53.491556 i TraceContext     TraceContext.cpp(01505) : UserName=SYSTEM, ApplicationUserName=root, ApplicationName=backup, StatementHash=178ff6ea3181fd8c2375efb679c33ee, StatementExecutionID=28147927167914\n","stream":"stdout","time":"2021-11-01T10:22:54.927233278Z"}
{"log":"nameserver_c67db375-4bc9-494d-8e9f-86b919b3677d.30001.000.trc: [3522][102846][362/-1] 2021-11-01 10:22:53.491556 i Logger          LoggerImpl.cpp(02057) : Activating log backup, since initial data backup is about to start\n","stream":"stdout","time":"2021-11-01T10:22:54.927236992Z"}
{"log":"nameserver_c67db375-4bc9-494d-8e9f-86b919b3677d.30001.000.trc: [3522][102846][362/-1] 2021-11-01 10:22:53.491572 i Savepoint       SavepointImpl.cpp(03791) : Starting initial BACKUP DATA, recoverability of the database will be ensured afterwards\n","stream":"stdout","time":"2021-11-01T10:22:54.927239563Z"}
{"log":"nameserver_c67db375-4bc9-494d-8e9f-86b919b3677d.30001.000.trc: [3522][102846][362/-1] 2021-11-01 10:22:53.929407 i TraceContext     TraceContext.cpp(01505) : UserName=SYSTEM, ApplicationUserName=root, ApplicationName=backup, StatementHash=178ff6ea3181fd8c2375efb679c33ee, StatementExecutionID=28147927167914\n","stream":"stdout","time":"2021-11-01T10:22:54.927242129Z"}
{"log":"nameserver_c67db375-4bc9-494d-8e9f-86b919b3677d.30001.000.trc: [3522][102846][362/-1] 2021-11-01 10:22:53.929407 i PhysicalPageAcce DataVolumeTouchManagerImpl.cpp(00041) : DataVolumeTouchPagesJob cannot start due to wrong state of PM (isPersManInReadyState=1 isTouchManagerInShutdown=0 isEncryptionConvertionActive=1)\n","stream":"stdout","time":"2021-11-01T10:22:54.927244476Z"}
{"log":"nameserver_c67db375-4bc9-494d-8e9f-86b919b3677d.30001.000.trc: [3522][102846][362/-1] 2021-11-01 10:22:53.929424 i Savepoint       SavepointImpl.cpp(03104) : Snapshot current savepoint version: 7, restart redo log position: 0x136243, next savepoint version: 8, last snapshot SP version: 7, kind: Backup\n","stream":"stdout","time":"2021-11-01T10:22:54.927247482Z"}
{"log":"backint.log: 2021-11-01 10:22:55.374 backint terminated:\n","stream":"stdout","time":"2021-11-01T10:22:55.374676896Z"}
{"log":"backint.log:   pid: 3523\n","stream":"stdout","time":"2021-11-01T10:22:55.374696832Z"}
{"log":"backint.log:   exit code: 0\n","stream":"stdout","time":"2021-11-01T10:22:55.374700042Z"}
{"log":"backint.log:   output:\n","stream":"stdout","time":"2021-11-01T10:22:55.374702477Z"}
{"log":"backint.log:   [2021-11-01 10:22:54.956] - 3527 MainThread - backup_store.82 - INFO - Start backup of: /usr/sap/H00/SYS/global/hdb/backint/SYSTEMDB/initial_databackup_0_1 -\u003e Key: c67db375-4bc9-494d-8e9f-86b919b3677d/SYSTEMDB/initial_databackup_0_1\n","stream":"stdout","time":"2021-11-01T10:22:55.374704624Z"}
{"log":"backint.log:   #SOFTWAREID \"backint 1.06\"\"SAP Backint for Object Store 0.0.1\"\n","stream":"stdout","time":"2021-11-01T10:22:55.374707818Z"}
{"log":"backint.log:   #SAVED fN0JIqWex4ZYy6jOtaUnna1ImcVDS_Ws /usr/sap/H00/SYS/global/hdb/backint/SYSTEMDB/initial_databackup_0_1 24576\n","stream":"stdout","time":"2021-11-01T10:22:55.374710076Z"}
{"log":"backint.log:   metrics: source: 24576, destination: 24576, seconds: 0.275407075881958\n","stream":"stdout","time":"2021-11-01T10:22:55.374712378Z"}
{"log":"backup.log: 2021-11-01T10:22:55+00:00 P0001261   17cdb05f62f INFO  BACKUP   state of service: nameserver, c67db375-4bc9-494d-8e9f-86b919b3677d:30001, volume: 1, BackupExecuteTopologyBackupFinished\n","stream":"stdout","time":"2021-11-01T10:22:55.375111523Z"}
{"log":"backup.log: 2021-11-01T10:22:55+00:00 P0001261   17cdb05f62f INFO  BACKUP   start of progress monitoring, volumes: 1, bytes: 150994944\n","stream":"stdout","time":"2021-11-01T10:22:55.375185165Z"}
{"log":"backup.log: 2021-11-01T10:22:55+00:00 P0001261   17cdb05f62f INFO  BACKUP   state of service: nameserver, c67db375-4bc9-494d-8e9f-86b919b3677d:30001, volume: 1, BackupExecuteDataBackupInProgress\n","stream":"stdout","time":"2021-11-01T10:22:55.375425403Z"}

900

{"log":"daemon_c67db375-4bc9-494d-8e9f-86b919b3677d.30000.000.trc: [1210][-1][-/-1] 2021-11-01 10:22:54.054428 i Basis          NetworkChannel.cpp(03257) : [4d672491de5f0015,100.96.5.8:30000.-,DAE.0] Stop listening for connections on 100.96.5.8:30000\n","stream":"stdout","time":"2021-11-01T10:22:55.395263613Z"}
{"log":"daemon_c67db375-4bc9-494d-8e9f-86b919b3677d.30000.000.trc: [1210][-1][-/-1] 2021-11-01 10:22:54.051475 i Daemon         Backint.cpp(00427) : Backint \"/usr/sap/H00/SYS/global/hdb/opt/hdbbackint -f backup -p /usr/sap/H00/SYS/global/hdb/opt/hdbbackint.H00.cfg -i /var/tmp/hdbbackint_H00.l32g5K -o /var/tmp/hdbbackint_H00.o3OlGl -u H00 -s 163576217348 7 -c 2 -l COMPLETE\", requested by process 1261 started with pid 3523\n","stream":"stdout","time":"2021-11-01T10:22:55.395279182"}
{"log":"daemon_c67db375-4bc9-494d-8e9f-86b919b3677d.30000.000.trc: [1210][-1][-/-1] 2021-11-01 10:22:54.051541 i Daemon         NetworkConnection.cpp(00238) : Connection from 100.96.5.8/56776_tcp (pid 1261) over socket 13. Handled message \"execute backint\", sending 241 bytes back\n","stream":"stdout","time":"2021-11-01T10:22:55.395284298Z"}
{"log":"daemon_c67db375-4bc9-494d-8e9f-86b919b3677d.30000.000.trc: [1210][-1][-/-1] 2021-11-01 10:22:54.051926 i Daemon         NetworkListener.cpp(01021) : Finishing connection channel {\u003cNetworkChannel|SSLFilter\u003e={\u003cNetworkChannelBase\u003e={this=94919751954456, fd=13, refCnt=1, local=100.96.5.8/56776_tcp, state=Connected, pending=[---]}}\n","stream":"stdout","time":"2021-11-01T10:22:55.395293776Z"}
{"log":"daemon_c67db375-4bc9-494d-8e9f-86b919b3677d.30000.000.trc: [1210][-1][-/-1] 2021-11-01 10:22:54.051950 i Daemon         NetworkListener.cpp(01036) : Closing connection finished channel {\u003cNetworkChannel|SSLFilter\u003e={\u003cNetworkChannelBase\u003e={this=94919751954456, fd=13, refCnt=1, local=100.96.5.8/30000_tcp, remote=100.96.5.8/56776_tcp, state=Connected, pending=[---]}}\n","stream":"stdout","time":"2021-11-01T10:22:55.395330906Z"}
{"log":"daemon_c67db375-4bc9-494d-8e9f-86b919b3677d.30000.000.trc: [1210][-1][-/-1] 2021-11-01 10:22:54.051955 i Daemon         NetworkConnection.cpp(00271) : Closing connection channel, state FINISHED {\u003cNetworkChannel|SSLFilter\u003e={\u003cNetworkChannelBase\u003e={this=94919751954456, fd=13, refCnt=1, local=100.96.5.8/30000_tcp, remote=100.96.5.8/56776_tcp, state=Connected, pending=[---]}}\n","stream":"stdout","time":"2021-11-01T10:22:55.395339802Z"}
{"log":"daemon_c67db375-4bc9-494d-8e9f-86b919b3677d.30000.000.trc: [1210][-1][-/-1] 2021-11-01 10:22:55.291607 i Daemon         Backint.cpp(00182) : Wait for backint pid 3523 returned 3523, status: 0\n","stream":"stdout","time":"2021-11-01T10:22:55.395343068Z"}
{"log":"daemon_c67db375-4bc9-494d-8e9f-86b919b3677d.30000.000.trc: [1210][-1][-/-1] 2021-11-01 10:22:55.291626 i Daemon         DaemonHandle.cpp(00323) : Instance count 5. Searching for terminated processes\n","stream":"stdout","time":"2021-11-01T10:22:55.395386634Z"}
{"log":"daemon_c67db375-4bc9-494d-8e9f-86b919b3677d.30000.000.trc: [1210][-1][-/-1] 2021-11-01 10:22:55.291714 i Daemon         DaemonHandle.cpp(00443) : Process 'hdbcompileserver', pid 2153 is alive\n","stream":"stdout","time":"2021-11-01T10:22:55.395374218Z"}
{"log":"daemon_c67db375-4bc9-494d-8e9f-86b919b3677d.30000.000.trc: [1210][-1][-/-1] 2021-11-01 10:22:55.291747 i Daemon         DaemonHandle.cpp(00443) : Process 'hdbnameserver', pid 1261 is alive\n","stream":"stdout","time":"2021-11-01T10:22:55.395377661Z"}
{"log":"daemon_c67db375-4bc9-494d-8e9f-86b919b3677d.30000.000.trc: [1210][-1][-/-1] 2021-11-01 10:22:55.291775 i Daemon         DaemonHandle.cpp(00443) : Process 'hdbindexserver', pid 2344 is alive\n","stream":"stdout","time":"2021-11-01T10:22:55.395382096Z"}
{"log":"daemon_c67db375-4bc9-494d-8e9f-86b919b3677d.30000.000.trc: [1210][-1][-/-1] 2021-11-01 10:22:55.291802 i Daemon         DaemonHandle.cpp(00443) : Process 'hdbdiserver', pid 3027 is alive\n","stream":"stdout","time":"2021-11-01T10:22:55.395412579Z"}
{"log":"daemon_c67db375-4bc9-494d-8e9f-86b919b3677d.30000.000.trc: [1210][-1][-/-1] 2021-11-01 10:22:55.291828 i Daemon         DaemonHandle.cpp(00443) : Process 'hdbdpserver', pid 2937 is alive\n","stream":"stdout","time":"2021-11-01T10:22:55.395433216Z"}
{"log":"daemon_c67db375-4bc9-494d-8e9f-86b919b3677d.30000.000.trc: [1210][-1][-/-1] 2021-11-01 10:22:55.291845 i Daemon         Daemon.cpp(01059) : Daemon state \"running\", runlevels [current:reached:target]=[5:5:5]\n","stream":"stdout","time":"2021-11-01T10:22:55.395436752Z"}
{"log":"daemon_c67db375-4bc9-494d-8e9f-86b919b3677d.30000.000.trc: [1210][-1][-/-1] 2021-11-01 10:22:55.291910 i Daemon         Daemon.cpp(00152) : Shared memory updated, no daemon state change\n","stream":"stdout","time":"2021-11-01T10:22:55.395439471Z"}

{"log":"daemon_c67db375-4bc9-494d-8e9f-86b919b3677d.30000.000.trc: [1210]{-1}[-1/-1] 2021-11-01 10:22:55.373456 i Daemon           NetworkListener.cpp(01096) : New connection accepted from 100.96.5.8/56790_tcp over socket 13\n","stream":"stdout","time":"2021-11-01T10:22:55.395446965Z"}
{"log":"daemon_c67db375-4bc9-494d-8e9f-86b919b3677d.30000.000.trc: [1210]{-1}[-1/-1] 2021-11-01 10:22:55.373641 i Daemon           NetworkConnection.cpp(00226) : Connection from 100.96.5.8/56790_tcp (pid 1261) over socket 13. Process 'hdbnameserver'. Received message \"wait for pid\"\n","stream":"stdout","time":"2021-11-01T10:22:55.395455941Z"}
{"log":"daemon_c67db375-4bc9-494d-8e9f-86b919b3677d.30000.000.trc: [1210]{-1}[-1/-1] 2021-11-01 10:22:55.373649 i Daemon           NetworkConnection.cpp(00238) : Connection from 100.96.5.8/56790_tcp (pid 1261) over socket 13. Handled message \"wait for pid\", sending 18 bytes back\n","stream":"stdout","time":"2021-11-01T10:22:55.395459948Z"}
{"log":"daemon_c67db375-4bc9-494d-8e9f-86b919b3677d.30000.000.trc: [1210]{-1}[-1/-1] 2021-11-01 10:22:55.373684 i Daemon           NetworkListener.cpp(01021) : Finishing connection channel {\u003cNetworkChannelSSLFilter\u003e={this=9491975195446, fd=13, refCnt=1, local=100.96.5.8/30000_tcp, remote=100.96.5.8/56790_tcp, state=Connected, pending=[---]}}\n","stream":"stdout","time":"2021-11-01T10:22:55.395465645Z"}
{"log":"daemon_c67db375-4bc9-494d-8e9f-86b919b3677d.30000.000.trc: [1210]{-1}[-1/-1] 2021-11-01 10:22:55.373706 i Daemon           NetworkListener.cpp(01036) : Closing connection finished channel {\u003cNetworkChannelSSLFilter\u003e={this=9491975195446, fd=13, refCnt=1, local=100.96.5.8/30000_tcp, remote=100.96.5.8/56790_tcp, state=Connected, pending=[---]}}\n","stream":"stdout","time":"2021-11-01T10:22:55.395473928Z"}
{"log":"daemon_c67db375-4bc9-494d-8e9f-86b919b3677d.30000.000.trc: [1210]{-1}[-1/-1] 2021-11-01 10:22:55.373709 i Daemon           NetworkConnection.cpp(00271) : Closing connection channel, state FINISHED {\u003cNetworkChannelSSLFilter\u003e={this=9491975195446, fd=13, refCnt=1, local=100.96.5.8/30000_tcp, remote=100.96.5.8/56790_tcp, state=Connected, pending=[---]}}\n","stream":"stdout","time":"2021-11-01T10:22:55.395486359Z"}
{"log":"daemon_c67db375-4bc9-494d-8e9f-86b919b3677d.30000.000.trc: [1210]{-1}[-1/-1] 2021-11-01 10:22:55.394135 i Daemon           NetworkListener.cpp(01096) : New connection accepted from 100.96.5.8/56792_tcp over socket 13\n","stream":"stdout","time":"2021-11-01T10:22:55.395490924Z"}
{"log":"daemon_c67db375-4bc9-494d-8e9f-86b919b3677d.30000.000.trc: [1210]{-1}[-1/-1] 2021-11-01 10:22:55.394306 i Daemon           NetworkConnection.cpp(00226) : Connection from 100.96.5.8/56792_tcp (pid 1261) over socket 13. Process 'hdbnameserver'. Received message \"execute backint\"\n","stream":"stdout","time":"2021-11-01T10:22:55.395493512Z"}
{"log":"daemon_c67db375-4bc9-494d-8e9f-86b919b3677d.30000.000.trc: [1210]{-1}[-1/-1] 2021-11-01 10:22:55.394345 i Daemon           Utilities.cpp(00190) : The executable '/usr/sap/H00/SYS/global/hdb/opt/hdbbackint' is symlink to 'CURRENT/hdbbackint/hdbbackint'\n","stream":"stdout","time":"2021-11-01T10:22:55.401210393Z"}
{"log":"backint.log: 2021-11-01 10:22:55.401 backint started:\n","stream":"stdout","time":"2021-11-01T10:22:55.402205414Z"}
{"log":"backint.log:   command: /usr/sap/H00/SYS/global/hdb/opt/hdbbackint -f backup -p /usr/sap/H00/SYS/global/hdb/opt/hdbbackint.H00.cfg -i /var/tmp/hdbbackint_H00.mpIsiB -o /var/tmp/hdbbackint_H00.hCjBjg -u H00 -s 1635762173487 -c 2 -l COMPLETE\n","stream":"stdout","time":"2021-11-01T10:22:55.402218885Z"}
{"log":"backint.log:   pid: 3539\n","stream":"stdout","time":"2021-11-01T10:22:55.402218885Z"}
{"log":"backint.log:   input:\n","stream":"stdout","time":"2021-11-01T10:22:55.402221144Z"}
{"log":"backint.log: #SOFTWAREID \"backint 1.04\" \"HANA HDB server 4.00.000.00.1635232484\"\n","stream":"stdout","time":"2021-11-01T10:22:55.402223287Z"}
{"log":"backint.log: #PIPE \"/usr/sap/H00/SYS/global/hdb/backint/SYSTEMDB/initial_databackup_1_1\"\n","stream":"stdout","time":"2021-11-01T10:22:55.402225844Z"}
{"log":"daemon_c67db375-4bc9-494d-8e9f-86b919b3677d.30000.000.trc: [1210]{-1}[-1/-1] 2021-11-01 10:22:55.400470 i Daemon           NetworkConnection.cpp(00271) : Closing connection channel, state READING {\u003cNetworkChannelSSLFilter\u003e={this=9491975195446, fd=13, refCnt=1, local=100.96.5.8/30000_tcp, remote=100.96.5.8/56792_tcp, state=Connected, pending=[---]}}\n","stream":"stdout","time":"2021-11-01T10:22:55.404346699Z"}
{"log":"daemon_c67db375-4bc9-494d-8e9f-86b919b3677d.30000.000.trc: [1210]{-1}[-1/-1] 2021-11-01 10:22:55.404110 w Environment      NetworkListener.cpp(00960) : Child process deletes daemon port\n","stream":"stdout","time":"2021-11-01T10:22:55.404364579Z"}

```
{"log":"daemon_c67db375-4bc9-494d-8e9f-86b919b3677d.30000.000.trc: [1210]{-1}[-/-] 2021-11-01 10:22:58.433666 i Daemon          NetworkConnection.cpp(00226) : Connection from 100.96.5.8/56812_tcp (pid 1261) over socket 13. Process 'hdbnameserver'. Received message \"wait for pid\"\n","stream":"stdout","time":"2021-11-01T10:22:58.497470159Z"}
{"log":"daemon_c67db375-4bc9-494d-8e9f-86b919b3677d.30000.000.trc: [1210]{-1}[-/-] 2021-11-01 10:22:58.433673 i Daemon          NetworkConnection.cpp(00238) : Connection from 100.96.5.8/56812_tcp (pid 1261) over socket 13. Handled message \"wait for pid\", sending 18 bytes back\n","stream":"stdout","time":"2021-11-01T10:22:58.497472769Z"}
{"log":"daemon_c67db375-4bc9-494d-8e9f-86b919b3677d.30000.000.trc: [1210]{-1}[-/-] 2021-11-01 10:22:58.433709 i Daemon          NetworkListener.cpp(01021) : Finishing connection channel {\u003cNetworkChannelSSLFilter\u003e={\u003cNetworkChannelBase\u003e={this=94919751954456, fd=13, refCnt=1, local=100.96.5.8/30000_tcp, remote=100.96.5.8/56812_tcp, state=Connected, pending=[---]}}}\n","stream":"stdout","time":"2021-11-01T10:22:58.497475539Z"}
{"log":"daemon_c67db375-4bc9-494d-8e9f-86b919b3677d.30000.000.trc: [1210]{-1}[-/-] 2021-11-01 10:22:58.433732 i Daemon          NetworkListener.cpp(01036) : Closing connection finished channel {\u003cNetworkChannelSSLFilter\u003e={\u003cNetworkChannelBase\u003e={this=94919751954456, fd=13, refCnt=1, local=100.96.5.8/30000_tcp, remote=100.96.5.8/56812_tcp, state=Connected, pending=[---]}}}\n","stream":"stdout","time":"2021-11-01T10:22:58.497479341Z"}
{"log":"daemon_c67db375-4bc9-494d-8e9f-86b919b3677d.30000.000.trc: [1210]{-1}[-/-] 2021-11-01 10:22:58.433734 i Daemon          NetworkConnection.cpp(00271) : Closing connection channel, state FINISHED {\u003cNetworkChannelSSLFilter\u003e={\u003cNetworkChannelBase\u003e={this=94919751954456, fd=13, refCnt=1, local=100.96.5.8/56812_tcp, remote=100.96.5.8/56812_tcp, state=Connected, pending=[---]}}}\n","stream":"stdout","time":"2021-11-01T10:22:58.497486624Z"}
{"log":"daemon_c67db375-4bc9-494d-8e9f-86b919b3677d.30000.000.trc: [1210]{-1}[-/-] 2021-11-01 10:22:58.496239 i Daemon          NetworkListener.cpp(01096) : New connection accepted from 100.96.5.8/56814_tcp over socket 13\n","stream":"stdout","time":"2021-11-01T10:22:58.497491589Z"}
{"log":"daemon_c67db375-4bc9-494d-8e9f-86b919b3677d.30000.000.trc: [1210]{-1}[-/-] 2021-11-01 10:22:58.496434 i Daemon          NetworkConnection.cpp(00226) : Connection from 100.96.5.8/56814_tcp (pid 1261) over socket 13. Process 'hdbnameserver'. Received message \"execute backint\"\n","stream":"stdout","time":"2021-11-01T10:22:58.497494041Z"}
{"log":"daemon_c67db375-4bc9-494d-8e9f-86b919b3677d.30000.000.trc: [1210]{-1}[-/-] 2021-11-01 10:22:58.496478 i Daemon          Utilities.cpp(00190) : The executable '/usr/sap/H00/SYS/global/hdb/opt/hdbbackint' is symlink to 'CURRENT/hdbbackint/hdbbackint'\n","stream":"stdout","time":"2021-11-01T10:22:58.503476666Z"}
{"log":"backint.log: 2021-11-01 10:22:58.504 backint started:\n","stream":"stdout","time":"2021-11-01T10:22:58.504421656Z"}
{"log":"backint.log:   command: /usr/sap/H00/SYS/global/hdb/opt/hdbbackint -f backup -p /usr/sap/H00/SYS/global/hdb/opt/hdbbackint.H00.cfg -i /var/tmp/hdbbackint_H00.HxYrVk -o /var/tmp/hdbbackint_H00.2lK3Gz -u H00 -s 1635762178481 -c 1 -l LOG\n","stream":"stdout","time":"2021-11-01T10:22:58.504435515Z"}
{"log":"backint.log:   pid: 3559\n","stream":"stdout","time":"2021-11-01T10:22:58.504440716Z"}
{"log":"backint.log:   input:\n","stream":"stdout","time":"2021-11-01T10:22:58.504442904Z"}
{"log":"backint.log:   #SOFTWAREID \"backint 1.04\" \"HANA HDB server 4.00.000.00.1635232484\"\n","stream":"stdout","time":"2021-11-01T10:22:58.504445512Z"}
{"log":"backint.log:   #PIPE \"/usr/sap/H00/SYS/global/hdb/backint/SYSTEMDB/log_backup_0_0_0_0\"\n","stream":"stdout","time":"2021-11-01T10:22:58.504448108Z"}
{"log":"daemon_c67db375-4bc9-494d-8e9f-86b919b3677d.30000.000.trc: [1210]{-1}[-/-] 2021-11-01 10:22:58.502670 i Daemon          NetworkConnection.cpp(00271) : Closing connection channel, state READING {\u003cNetworkChannelSSLFilter\u003e={\u003cNetworkChannelBase\u003e={this=94919751954456, fd=13, refCnt=1, local=100.96.5.8/30000_tcp, remote=100.96.5.8/56814_tcp, state=Connected, pending=[---]}}}\n","stream":"stdout","time":"2021-11-01T10:22:58.506487227Z"}
{"log":"daemon_c67db375-4bc9-494d-8e9f-86b919b3677d.30000.000.trc: [1210]{-1}[-/-] 2021-11-01 10:22:58.506232 w Environment     NetworkListener.cpp(00960) : Child process deletes daemon port\n","stream":"stdout","time":"2021-11-01T10:22:58.506498219Z"}
{"log":"daemon_c67db375-4bc9-494d-8e9f-86b919b3677d.30000.000.trc: [1210]{-1}[-/-] 2021-11-01 10:22:58.506286 i Environment     Environment.cpp(00258) : Changing environment unset TREXDAEMON_PORT=\n","stream":"stdout","time":"2021-11-01T10:22:58.506584108Z"}
{"log":"daemon_c67db375-4bc9-494d-8e9f-86b919b3677d.30000.000.trc: [1210]{-1}[-/-] 2021-11-01 10:22:58.506347 i Basis           NetworkChannel.cpp(03257) : [4d672491de5f0016,127.0.0.1:30000,-,DAE,0] Stop listening for connections on 127.0.0.1:30000\n","stream":"stdout","time":"2021-11-01 10:22:53.966729 i RequestHandler
{"log":"SYSTEMDB/lss_c67db375-4bc9-494d-8e9f-86b919b3677d.SYSTEMDB.000.trc: [810]{-1}[-1/-1] 2021-11-01 10:22:59.44357721Z"}
RequestHandler.cpp(00048) : exportTenantBackup() took 36248 us\n","stream":"stdout","time":"2021-11-01T10:22:59.44357721Z"}
```

{"log":"nameserver_c67db375-4bc9-494d-8e9f-86b919b3677d.30001.audit.000.csv: 2021-11-01T10:23:32.533504Z;nameserver;c67db375-4bc9-494d-8e9f-86b919b3677d;H00;00;30001;;;;;;SUCCESSFUL;global.ini;customizable_functionalities;backup.ignore_path_restrict;false;;ALTER SYSTEM ALTER CONFIGURATION ('global.ini', 'SYSTEM') SET ('customizable_functionalities', 'backup.ignore_path_restrict') = 'false';102848;root;;;;;SYSTEM;manager;SYSTEM;false;\n","stream":"stdout","time":"2021-11-01T10:23:32.535785313Z"}
{"log":"nameserver_c67db375-4bc9-494d-8e9f-86b919b3677d.30001.audit.000.csv: 2021-11-01T10:23:32.539147Z;nameserver;c67db375-4bc9-494d-8e9f-86b919b3677d;H00;00;30001;;;;;;SUCCESSFUL;global.ini;customizable_functionalities;backup;false;;ALTER SYSTEM ALTER CONFIGURATION ('global.ini', 'SYSTEM') SET ('customizable_functionalities', 'backup') = 'false';102848;root;;;;;SYSTEM;manager;SYSTEM;false;\n","stream":"stdout","time":"2021-11-01T10:23:32.541289765Z"}
{"log":"nameserver_c67db375-4bc9-494d-8e9f-86b919b3677d.30001.audit.000.csv: 2021-11-01T10:23:32.544609Z;nameserver;c67db375-4bc9-494d-8e9f-86b919b3677d;H00;00;30001;;;;;;SUCCESSFUL;multidb.ini;readonly_parameters;backup;*;;ALTER SYSTEM ALTER CONFIGURATION ('multidb.ini', 'SYSTEM') SET ('readonly_parameters', 'backup') = '*';102848;root;;;;;SYSTEM;manager;SYSTEM;*;\n","stream":"stdout","time":"2021-11-01T10:23:32.546636788Z"}
{"log":"nameserver_c67db375-4bc9-494d-8e9f-86b919b3677d.30001.audit.000.csv: 2021-11-01T10:23:32.542207Z;nameserver;c67db375-4bc9-494d-8e9f-86b919b3677d;H00;00;30001;;;;;;SUCCESSFUL;multidb.ini;readonly_parameters;basepath_databackup,basepath_logbackup,basepath_catalogbackup,basepath_rootkeybackup,log_replay_step_size,enable_auto_log_backup,log_backup_timeout_s,log_mode;;ALTER SYSTEM ALTER CONFIGURATION ('multidb.ini', 'SYSTEM') SET ('readonly_parameters', 'persistence') = 'basepath_databackup,basepath_logbackup,basepath_catalogbackup,basepath_rootkeybackup,log_replay_step_size,enable_auto_log_backup,log_backup_timeout_s,log_mode';102848;root;;;;;SYSTEM;manager;SYSTEM;basepath_databackup,basepath_logbackup,basepath_catalogbackup,basepath_rootkeybackup,log_replay_step_size,enable_auto_log_backup,log_backup_timeout_s,log_mode;\n","stream":"stdout","time":"2021-11-01T10:23:32.575521456Z"}
{"log":"nameserver_c67db375-4bc9-494d-8e9f-86b919b3677d.30001.audit.000.csv: 2021-11-01T10:23:32.564871Z;nameserver;c67db375-4bc9-494d-8e9f-86b919b3677d;H00;00;30001;;;;;;SUCCESSFUL;multidb.ini;readonly_parameters;persistence;enable_auto_log_backup,log_backup_timeout_s,log_mode,basepath_databackup,basepath_logbackup,basepath_catalogbackup,basepath_rootkeybackup,log_replay_step_size;;ALTER SYSTEM ALTER CONFIGURATION ('multidb.ini', 'SYSTEM') SET ('readonly_parameters', 'persistence') = 'enable_auto_log_backup,log_backup_timeout_s,log_mode,basepath_databackup,basepath_logbackup,basepath_catalogbackup,basepath_rootkeybackup,log_replay_step_size';102848;root;;;;;SYSTEM;manager;SYSTEM;enable_auto_log_backup,log_backup_timeout_s,log_mode,basepath_databackup,basepath_logbackup,basepath_catalogbackup,basepath_rootkeybackup,log_replay_step_size;\n","stream":"stdout","time":"2021-11-01T10:23:32.568077463Z"}
{"log":"nameserver_c67db375-4bc9-494d-8e9f-86b919b3677d.30001.audit.000.csv: 2021-11-01T10:23:32.576637Z;nameserver;c67db375-4bc9-494d-8e9f-86b919b3677d;H00;00;30001;;;;;;SUCCESSFUL;multidb.ini;readonly_parameters;persistence;log_replay_step_size,enable_auto_log_backup,log_backup_timeout_s,log_mode,basepath_databackup,basepath_logbackup,basepath_catalogbackup,basepath_rootkeybackup;;ALTER SYSTEM ALTER CONFIGURATION ('multidb.ini', 'SYSTEM') SET ('readonly_parameters', 'persistence') = 'log_replay_step_size,enable_auto_log_backup,log_backup_timeout_s,log_mode,basepath_databackup,basepath_logbackup,basepath_catalogbackup,basepath_rootkeybackup';102848;root;;;;;SYSTEM;manager;SYSTEM;log_replay_step_size,enable_auto_log_backup,log_backup_timeout_s,log_mode,basepath_databackup,basepath_logbackup,basepath_catalogbackup,basepath_rootkeybackup;\n","stream":"stdout","time":"2021-11-01T10:23:32.578855555Z"}
{"log":"nameserver_c67db375-4bc9-494d-8e9f-86b919b3677d.30001.audit.000.csv: 2021-11-01T10:23:32.583122Z;nameserver;c67db375-4bc9-494d-8e9f-86b919b3677d;H00;00;30001;;;;;;SUCCESSFUL;global.ini;database_initial_encryption;encryption_config_control;system_database;;102848;root;;;;;SYSTEM;manager;SYSTEM;system_database;\n","stream":"stdout","time":"2021-11-01T10:23:32.585841335Z"}
{"log":"DB_H00/indexserver_c67db375-4bc9-494d-8e9f-86b919b3677d.30040.executed_statements.000.trc: 202663;19;0;8704309571 23018;e30f106f45b2edf197a3bdc5fb46a2a7;_SYS_STATISTICS;;1635762156395863;21730;_SYS_STATISTICS.SHARED_COPY_PROFILES,_SYS_STATISTICS.SYS_STATISTICS_PROPERTIES;0;;;;0;;;;0;;15;_SYS_STATISTICS;;0;\n","stream":"stdout","time":"2021-11-01T10:23:32.774807096Z"}

FIG. 10P 2021-10-31 19: 58: 03 {"State": "Success", "dataBackupOperation": "DATA_BACKUP"}
2021-10-31 19:57:55 log="2021-10-31T19:57:55+00:00 P0001380 17cd7edd5c4 INFO BACKUP SAVE DATA finished successfully"
2021-10-31 19: 57:40 log="2021-10-31T19:57:40+00:00 P0001380 17cd7edd5c4 INFO BACKUP SAVE DATA started (1635710260676]"
2021-10-30 19: 56: 15 {"State": "Success", "dataBackupOperation": "DATA_BACKUP"}
2021-10-30 19: 56:05 log="2021-10-30T19:56:05+00:00 P0001380 17cd2c5cfa7 INFO BACKUP SAVE DATA finished successfully"
2021-10-30 19: 55:51 log="2021-10-30T19:55:51+00:00 P0001380 17cd2c5cfa7 INFO BACKUP SAVE DATA started [1635623751591]"
2021-10-30 10:37:03 {"State":"Success"} ← 1110a Log labels 1120a        ← 1120
Application    HanaBackupAuditEvents
Event          RootKeysChanged
hana_service_id  19720b06-bf40-43a9-8ed7-28c11beea9aa

FIG. 11

DIFFERENTIAL LOGGING OF COMPUTING PROCESSES

FIELD

The present disclosure generally relates to logging associated with computing processes. Particular implementations provide that a first portion of log entries are written to a first log and a second portion of log entries are written to a second log, where in particular examples the second portion is a proper subset of the first portion.

BACKGROUND

Many computing processes involve the production of logs. Logs can be used for various purposes, and the information needed for a particular log can depend on particular purposes for which the log may be used. Some uses may be more immediate than others. Particularly for uses where log data should be maintained for long period of time, maintaining log data may not be feasible. In such cases, logs may be discarded, or logs may be maintained, but at a cost of storage resources and potentially computing resources needed to process the logs. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided to facilitate logging of computing processes. A computing process generates multiple log entries. A first portion of the multiple log entries are written to a first log. A second portion of the multiple log entries are written to the first log and to a second log, where the second portion is less than the first portion, such as being a proper subset of the first portion. Log entries can be determined to be written to the second log by scanning all or a portion of a log, by evaluating log entries as they are generated, or through computer code that causes log entries to be written to the second log. Typically, the second log is maintained for a longer period of time than the first log.

In one aspect, the present disclosure provides a method for differential logging. A computer-implemented process is executed, such as a process associated with database backup or recovery. During execution of the computer-implemented process, a first log entry is generated. It is determined that the first log entry is to be stored in a first log. The first log entry is caused to be stored in the first log.

During execution of the computer-implemented process, a second log entry is generated. It is determined that the second log entry is to be stored in the first log. The second log entry is caused to be stored in the first log. It is determined that the second log entry is to be stored in a second log. The second log entry is caused to be stored in the second log. The first log entry is not stored in the second log.

Although the terms "first" and "second" have been used with respect to the method, it should be appreciated that these terms are used to convey that the log entries are different, not that one log entry is generated before the other. For example, in some cases the second log entry is generated and stored in the first and second logs before the first log entry is generated.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

Figure 9B:
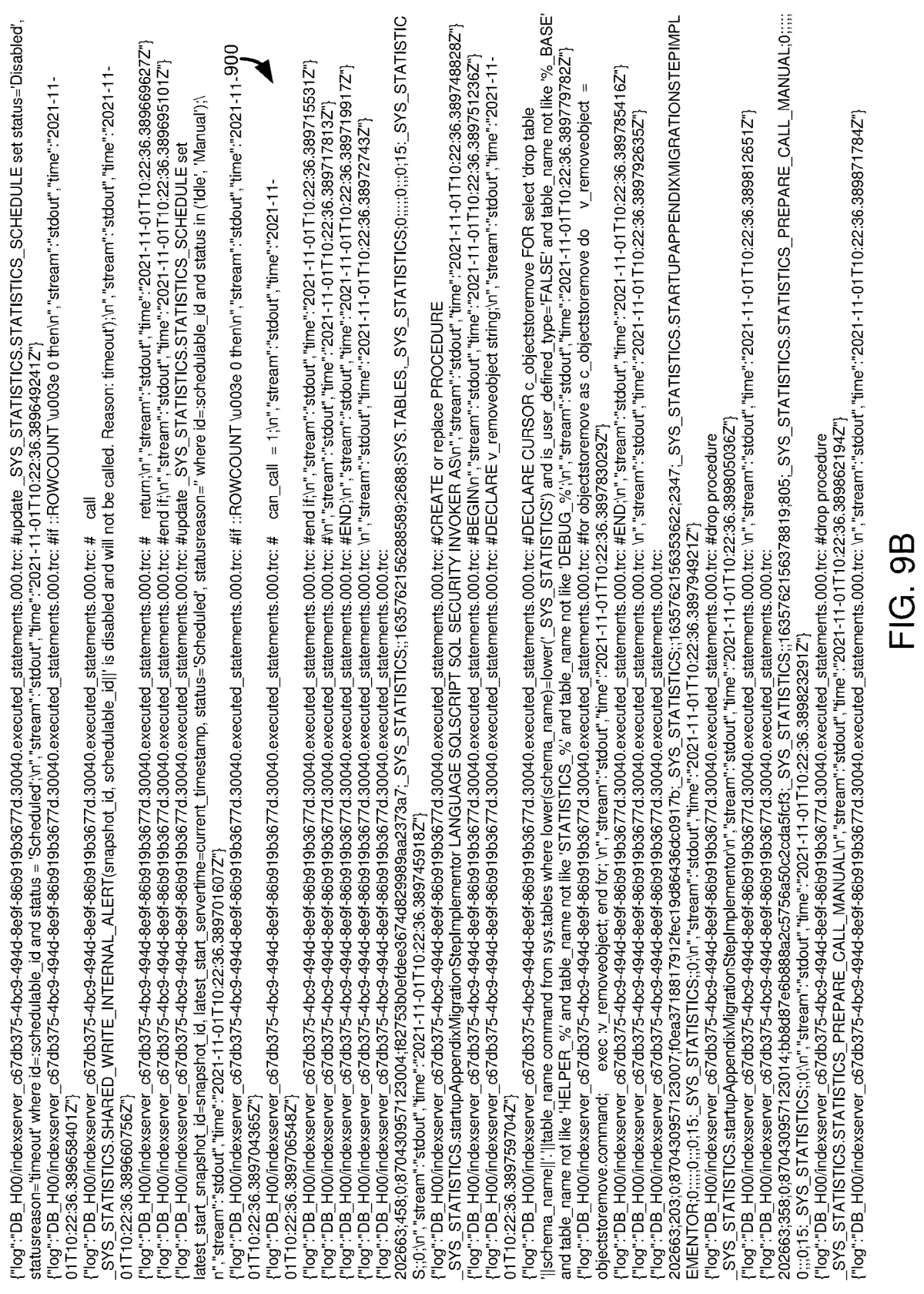
Figure 9G:
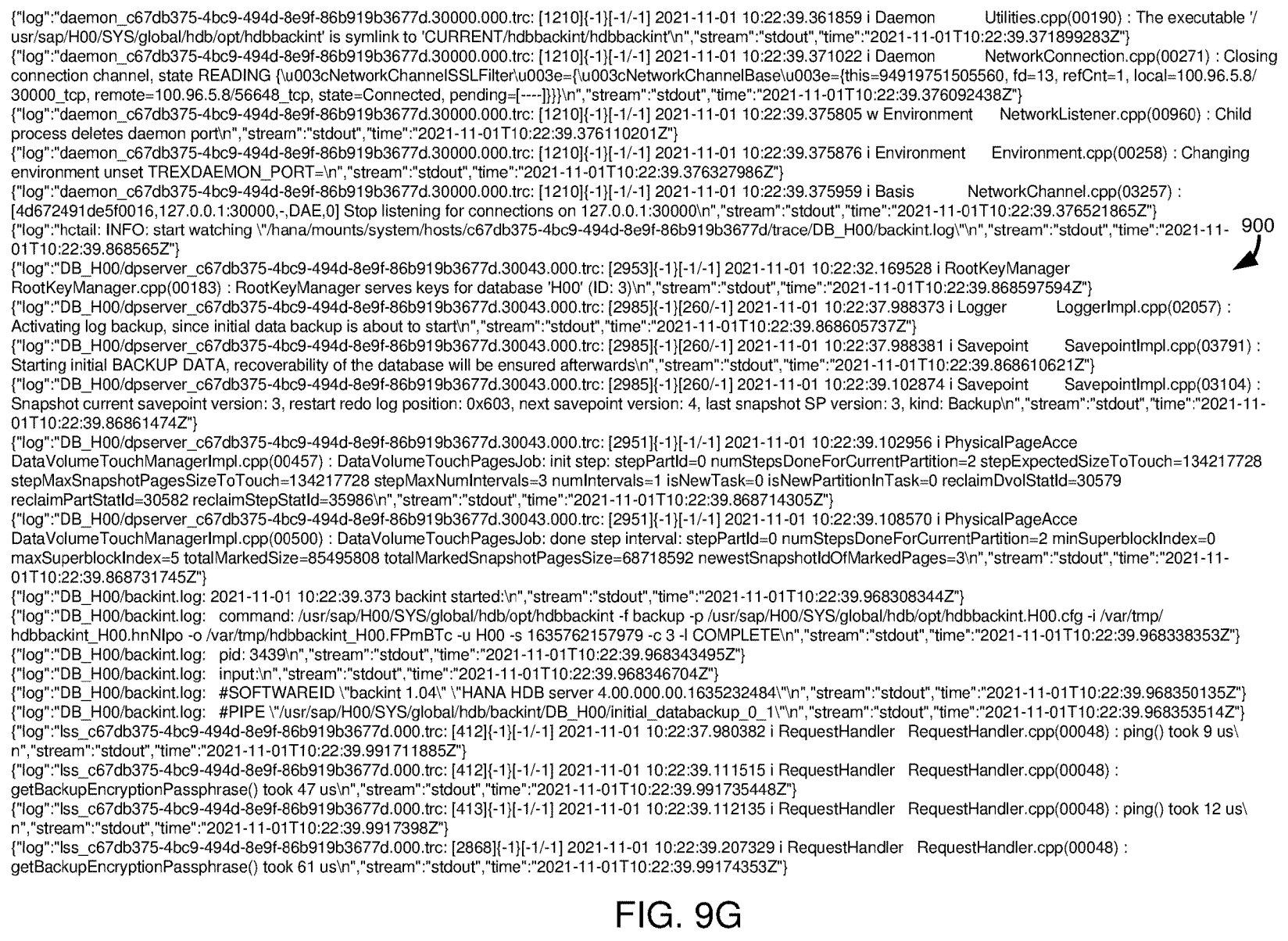
Figure 9I:
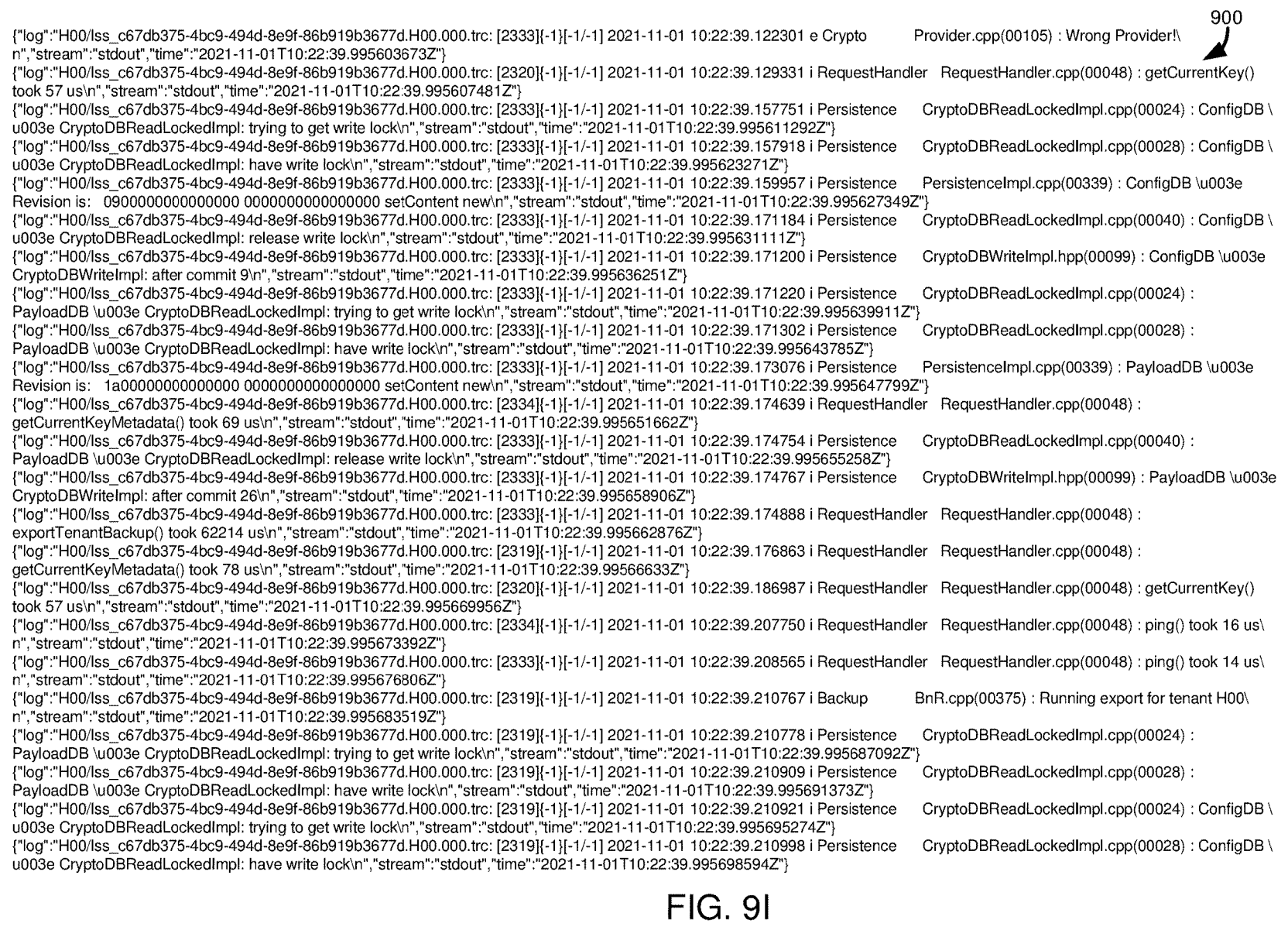
Figure 9L:
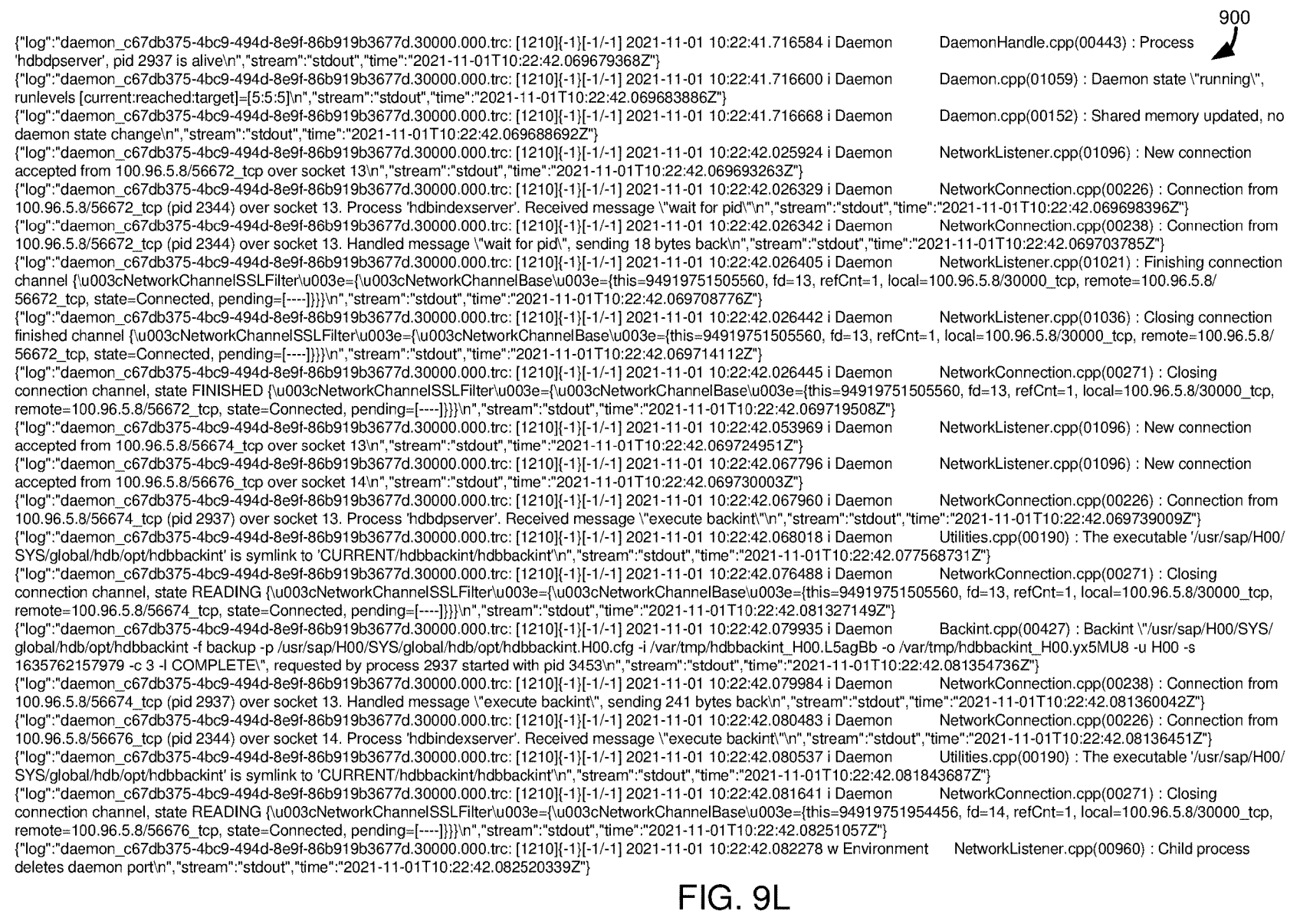
Figure 9N:
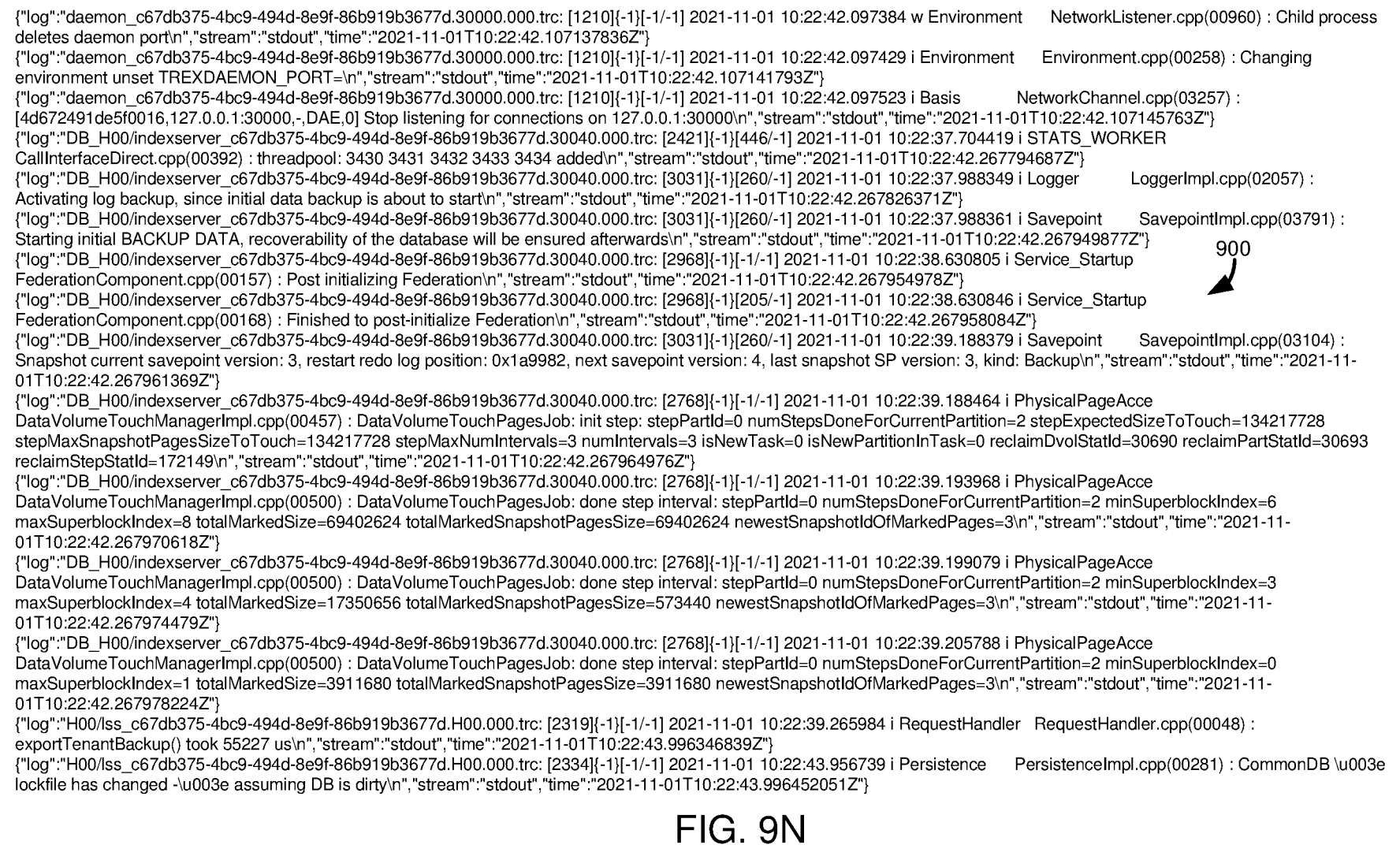
Figure 9Q:
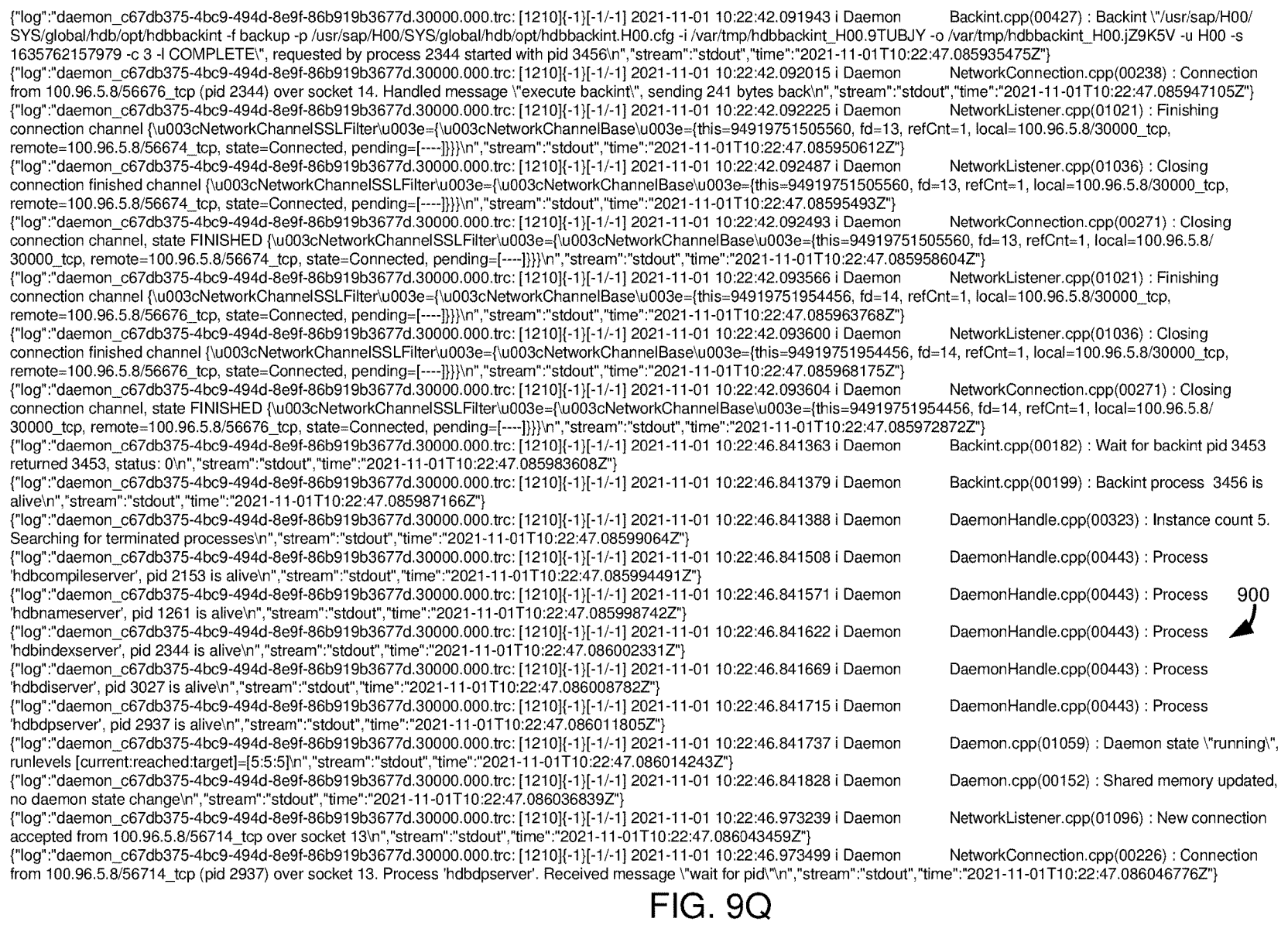
Figure 9W:
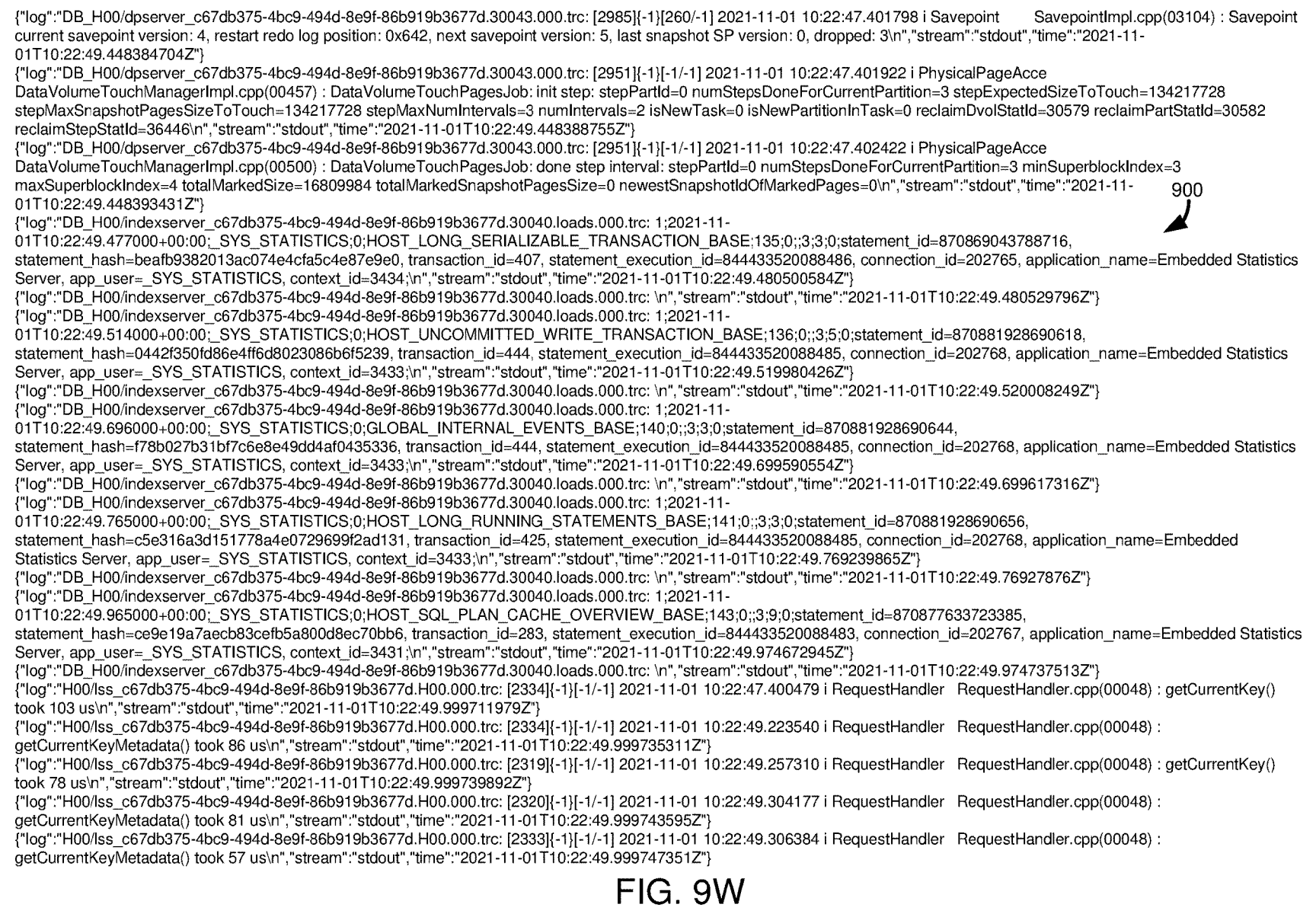

FIGS. 9A-9Z and 10A-10P provide an example log, selected entries of which can be included in multiple logs.

FIG. 11 illustrates example log entries selected for a differential log (e.g., entries from a larger pool of log entries) and labels that can be applied to log entries, such as for indexing purposes.

DETAILED DESCRIPTION

Example 1) —Overview

Figure 1:
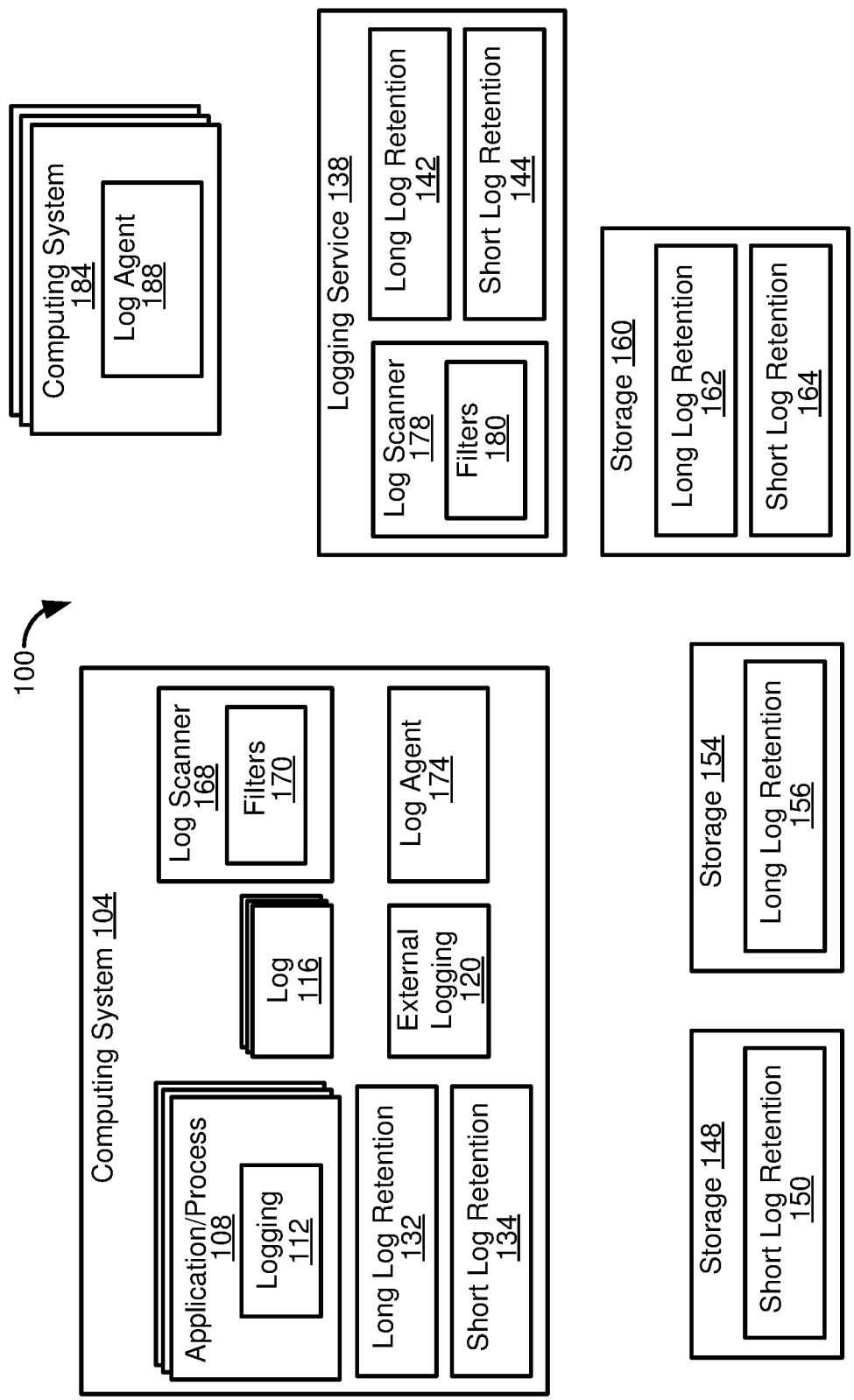
FIG. 1 is a diagram illustrating a computing environment in which differential logging can be implemented.

Many computing processes involve the production of logs. Logs can be used for various purposes, and the information needed for a particular log can depend on particular purposes for which the log may be used. Some uses may be more immediate than others. Particularly for uses where log data should be maintained for long period of time, maintaining log data may not be feasible. In such cases, logs may be discarded, or logs may be maintained, but at a cost of storage resources and potentially computing resources needed to process the logs. Accordingly, room for improvement exists.

Different processes or use scenarios can use different information that may be captured by a logging process. Often, a larger amount of log information is useful when the log is reviewed at periods close in time to when the activity occurred than for when the log is reviewed at later points in time. As an example, backup processes, such as for a database, can be carried out, either in response to a manual command or according to a scheduled or triggered process. For a relatively short period after logs are generated, more detailed information contained in the log can be useful. For example, if a backup operation fails, log information may be reviewed to determine individual logged backup operations to determine a cause of backup failure or to determine how to proceed from a backup failure (for example, resuming backup operations from a point prior to failure). Or, even if a backup operation completes, it may be useful to review detailed log information to confirm that a backup process operated as expected, including confirming that all information to be included in a backup job was in fact processed.

As time goes by, it can be increasingly less likely that detailed log information will be needed. However, at least some portions of a log can still be relevant at time periods further removed from the logged process. As an example, auditors may require access to logs for a longer period of time, such as to determine that backup operations occurred at a particular frequency and to determine whether backup operations completed successfully or not. So, while log entries indicating that a backup job started and whether the backup completed, completed with errors, or did not complete may be useful, more granular details of the backup operation captured in the log may not be relevant.

Typically, the above issues with logging have been addressed in two ways. One way of addressing the issue is to simply discard the logs after a period of time, even though some logged information might still be desired at later date. Or, the logs can be kept, even though the logs may require a large amount of storage space. In addition to taking up storage space, unnecessary log entries can take extra computing resources to load and process, including in searching a log for particular entries that might be of interest.

The present disclosure provides for differential logging. That is, an overall logging process can produce multiple versions of a log (collection of log entries). At least one version of the log can have a comparatively large amount of information and can be stored for a different time period than a log having a comparatively smaller amount of information. While typically larger logs are maintained for a shorter period of time than smaller logs, the retention periods can be reversed, or can be the same, without departing from at least some aspects of the present disclosure.

Differential logging can be carried out in a variety of ways. In one example, logs from an existing logging process are analyzed, such as to filter a log for entries that should be maintained in long term storage. These entries can be extracted and stored. In another example, log entries can be filtered on the fly. For instance, when a log entry is to be written to a first log, it can be analyzed to determine whether it satisfies criteria to be written to a second log.

In a further example, code that implements a process, such as process that generates log entries as part of a logging process or a dedicated logging process, can push log entries to selected logs, which can eliminate the need to scan log entries on the fly or to scan a generated log for entries to be included in another log.

In a specific implementation, described logging techniques can be used with database backup procedures. An existing database backup procedure can generate a backup log that contains a variety of entries, such as an entry indicating that a backup job started, an entry indicating that a backup job completed successfully, an entry indicating that a backup job completed with errors, an entry that a backup job failed, and entries for individual operations in a backup process (e.g., individual files or other data that was processed for backup). In a first example, all or a portion of the produced log is scanned to determine log entries to be included in a further log, such as a log with only a subset of the entries of the original log. In a second example, as the log entries are generated during backup, they are analyzed to determine whether they should be written to a secondary log in addition to being written to a primary log. In a third example, code that implements the backup process affirmatively generates appropriate log entries. For example, when code that starts a backup operation is executed, the code can cause a log entry to be written to both a primary log and a secondary log. Other operations, such backup information for particular files, may be associated with code that only writes information to a primary log.

Disclosed technologies can also be used with other database processes, including database process that add, delete, or modify database instances. For example, log entries can be written when the size of a database changes or when resources allocated to a database are modified. Similarly, at least certain configuration changes to a database can be logged.

Disclosed technologies can find use in a variety of computing environments. For example, logging techniques can be used by individual entities for their computing systems, or can be used in a hyperscalar or other type of centralized computing system where logging operations may be carried out on behalf of many entities. Disclosed techniques, including those using a logging service, can be beneficial in "private cloud" environments, where it can be beneficial to have all log activity occur within a single entity's computing systems, as opposed to transmitting logging information to computing systems operated by third parties. Logging can be carried out for processes that are automated or for processes that are manually triggered. For example, backup operations can be manually triggered, can be triggered according to a schedule, or can be triggered by various events.

Particularly for infrastructure or other service providers that provide computing resources to multiple entities, the maintenance of computing environments can be complex and time consuming. For example, it can be complex and time consuming to monitor the state of a database application, such as a database application running in a hyperscalar environment. Attempts have been made to automate the monitoring and maintenance of computing environments. In particular, software programs, such as KUBERNETES (the Linux Foundation Non-Profit Corporation), have been developed to automate deployment, scaling, and maintenance of containerized software applications (e.g., applications running within DOCKER (Docker, Inc.) containers).

Automation programs can include features that implement an "operator pattern" (or "operator"). An operator pattern provides a software agent that periodically polls the state of a computing environment. If a current state of the computing environment does not conform to a specified state, the automation program can take steps to bring the computing environment back to the specified state. Thus, maintenance can be implemented in a declarative manner (telling the operator what state to maintain), rather than using an imperative approach (where specific commands would be provided in order to alter a computing environment to maintain a state). For example, if a computing environment implements a database application, and a new database is added, an operator may be responsible for marshalling computing resources for the database and configuring the database for use. Operators can also take actions according to a schedule in response to events, including conducting backup or recovery operations.

Certain of the following Examples describe how disclosed techniques can be implemented in the specific embodiment of a computing environment using an automation platform, such as KUBERNETES, using containerized applications, such as applications running in DOCKER containers. However, disclosed technologies can be use in other environments that use an operator pattern. Or, disclosed technologies can be used in environments that do not use an operator pattern or which are not automatically managed.

Example 2) —Example Computing Environment with Differential Logging

FIG. 1 illustrates an example computing environment 100 in which disclosed technologies can be implemented. The computing environment 100 can include a computing system 104 that executes one or more applications or processes 108. Examples of applications and processes 108 include database applications or processes carried out by an operating system. The applications can themselves have processes, which can be included in the applications or processes 108, but the processes need not be part of a computer program that is typically thought of as an "application." For example, an operating system, framework, or "middleware" can be an interface between computing hardware and other applications, including applications with which end users interact. As another distinction, application processes may be associated with applications that are used for comparatively specific tasks, whereas other processes (non-application processes) may be associated with software programs that are used for more general purposes (e.g., managing memory, hardware, user input and output devices, etc.). Applications and their processes can be the same as, or analogous to, non-application processes in some cases. For example, an operating system may perform backup operations, as may a database application.

The applications or processes 108 can including logging functionality 112. Certain actions performed by the applications or processes 108 can result in log entries that are stored in one or more logs 116. For example, when a particular instruction or sets of instructions is executed by the applications or processes 108, code can insert a log entry in one or more of the logs 116. In at least some cases, the logs 116 are stored externally to the applications or processes 108, such as being stored in a file, such as a text file. In other cases, the logs can be configured to be more specifically used by the applications or processes 108, rather than for use by end users or other software applications. Logs 116 are typically persisted for at least some period of time, such as being stored on disk or another type of non-volatile storage. However, at least some logs, or log entries, can be used for a more limited duration, and can optionally be stored in volatile storage. For example, some log information can be maintained only until it is determined by a relevant application or process 108 that the log information is no longer needed (for example, because a particular function, routine, or other subprocess executed successfully), and then at least that relevant log information can be deleted from volatile or non-volatile storage.

For the purposes of the present disclosure, at least some of the information in a log 116 is intended to be stored beyond the completion of a subprocess that resulted in a log entry. Even more particularly, the present disclosure relates to log entries for which differential storage is desired—some types of log entries are to be stored for a longer period of time than other types of log entries.

Although in some cases logging functionality 112 is included within a particular application or process 108, in other cases logging can be carried out by an "external" application or process 120, where "external" refers to the application or process that generates log entries being different than the application or process 108 that executed the logged activity. For example, an external application or process 120 can monitor settings or repositories and log any changes that may have been made by an application or process 108 that interacts with such settings or repositories.

Log entries can be processed in a variety of ways such that all or a portion of the log entries are maintained in storage for a first duration and a portion of log entries are maintained for a second duration. As mentioned, typically a smaller portion of log entries are maintained in longer term storage compared with log entries stored in shorter term storage, although this need not be the case in all implementations of the disclosed technologies. Log processing techniques will be discussed in further Examples, but generally include post-processing of a log to determine log entries that should be stored for a different period of time than the processed log ("differential storage"), processing log entries as they are generated and storing at least a portion of the log entries in differential storage, or incorporating into a process commands that write a first portion of log entries to a first store and a second portion of the log entries to a second store, where in some, but not all, cases the second portion is a proper subset of the first portion, but in any case the second portion container fewer log entries than the first portion.

Logs can be maintained in one or more locations. For instance, FIG. 1 illustrates the computing system 104 as having long term log retention 132 and short term log retention 134. One or more logs (where a "log" can refer to an entire log/greater number of log entries or selected/a fewer number of log entries) can be stored at other locations instead of, or in addition to, being stored in the computing system 104. FIG. 1 illustrates that the computing system 104 can be in communication with a logging service 138, where the logging service includes one or both of log term log retention 142 and short term log retention 144. Logs can be stored in other storage locations, in addition to or in place of one or both of the computing system 104 or the logging service 138, where storage 148 is shown as having short term log retention 150, storage 154 is shown as having long term log retention 156, and storage 160 is shown as having long term log retention 162 and short term log retention 164.

The computing system 104 can include components to help generate or store differential logs. For example, the computing system 104 can include a log scanner 168. The log scanner 168 can use a set of filters, or selection criteria, 170 to analyze logs 116, or individual log entries as they are generated, where log entries satisfying filter/selection criteria can be stored in the long term retention 132 and/or the short term log retention 134, or transmitted to the logging service 138 to be stored in the long term log retention 142 or in the short term log retention 144. In some cases, some log data, such as short term log data is stored on the computing system 104, while other log data, such as long term log data, is stored elsewhere, such as by the logging service 138 or storage 148, 154, 160.

The computing system 104 can include a log agent 174 that communicates with the logging service 138. For example, the log agent 174 can send entire logs or selected log entries to the logging service 138, where relevant log entries can be stored in the long term log retention 142 or the short term log retention 144. When logs or log entries are not filtered or classified (e.g., for storage type) by the computing system 104, the logging service 138 may include a log scanner 178 and filters 180 that can be configured analogously to the log scanner 168 and the filter/selection criteria 170.

In at least some implementations, the computing environment 100 includes a plurality of computing systems, such as including computing system 104 and one or more additional computing systems 184 having log agents 188. The additional computing systems 184 can be configured in one of the manners described for the computing system 104, although a given computing system 184 can be configured differently than a particular implementation of the computing system 104. The additional computing systems 184 include a log agent 188 for sending log information (e.g., logs or log entries) to the logging service 138. The use of computing systems 184 with log agents 188 can be useful when, for example, logging is carried out for multiple computing systems in the computing environment 100, such as when the computing environment represents a cloud-based/hyperscalar computing environment. In this implementation, the computing system 104 can include application/processes 108, logs 116, etc. for multiple users of the cloud/hyperscalar environment, where users may be associated with discrete computing systems 104, 184 or where multiple users may use a single computing system.

Figure 2:
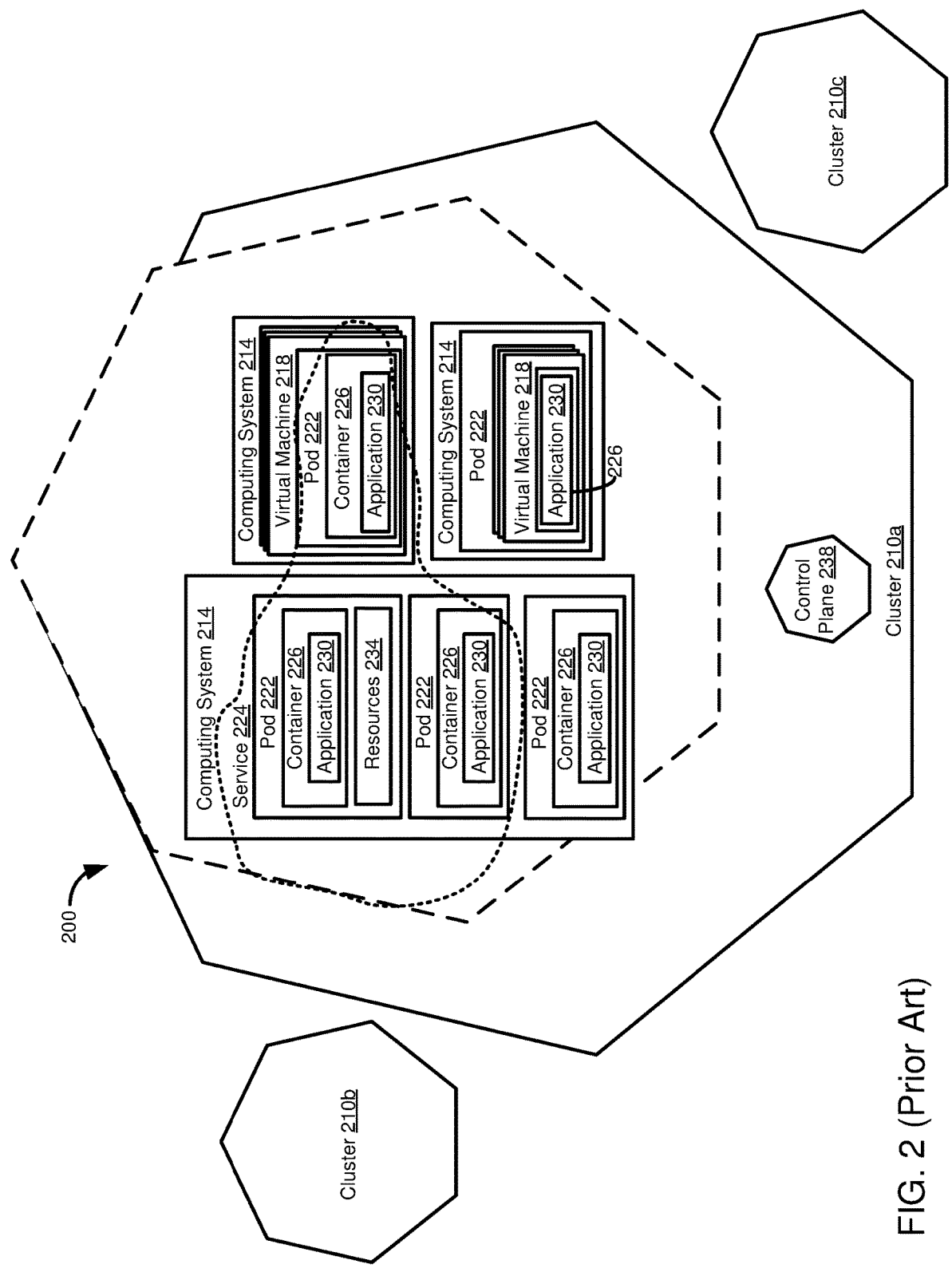
FIG. 2 is a diagram illustrating a computing environment in which containerized applications are managed automatically by software.

Example 3) —Example Computing Environment with Automated Management of Containerized Applications FIG. 2 illustrates an example computing environment 200 in which disclosed technologies can be implemented. The computing environment 200 can include a plurality of computing clusters 210, shown as clusters 210a-210c. Cluster 210a is illustrated showing details of components that can be included in the clusters 210. The cluster 210a can include a plurality of computing systems 214. At least a portion of the computing systems 214 can include one or more virtual machines 218.

A computing system 214, or a virtual machine 218 running within a computing system, can host one or more pods 222, where a given pod can in turn host one or more applications 230 running inside a respective container 226. At least a portion of the pods 222 can include resources 234, such as having all or a portion of a storage volume assigned to the pod. One or more pods 222 can be combined into a service 224, where the pods in a service can be located on the same computing system 214 or on different computing systems.

A cluster 210 can be managed by a control plane 238. Among other things, the control plane 238 can prove an API (not shown in FIG. 2) for interacting with the cluster 210 and its constituent components. The API can include methods for accessing custom resources defined for the cluster 210, and can implement an operator pattern for controlling such resources. In a particular example, the operator pattern can manage backup or restore processes for a database system, or can manage other database processes.

Figure 3:
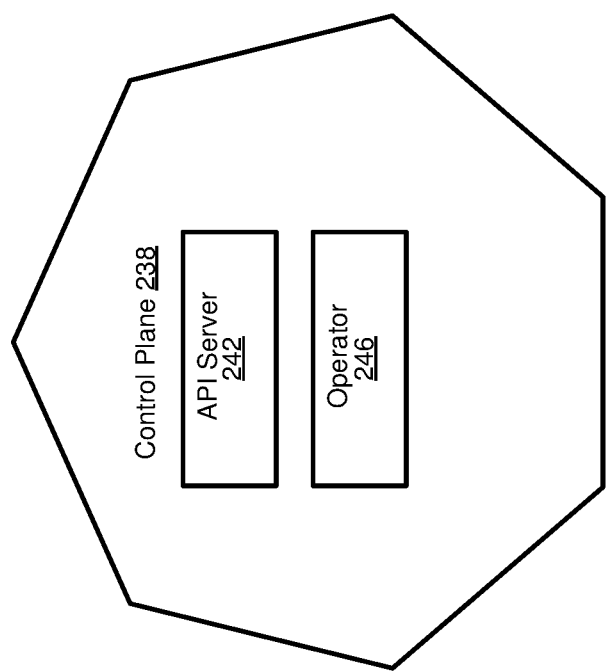
FIG. 3 is a diagram illustrating a control plane useable to manage the containerized applications in the computing environment of FIG. 2.

The control plane 238 is further shown in FIG. 3 as including an API server 242 and an operator 246.

Example 4) —Example Processing of Logs or Log Entries for Differential Logging

Figure 4:
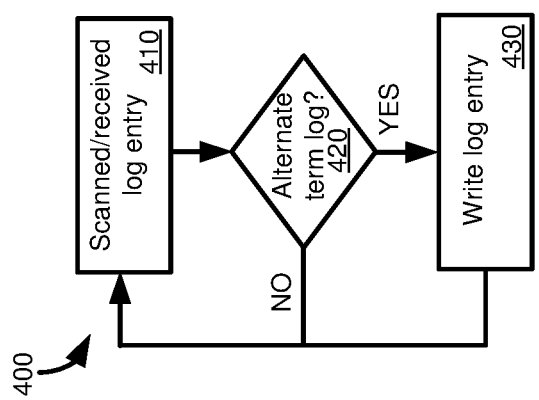

FIG. 4 provides a flowchart of a method 400 for differential logging. The method 400 can represent a technique for "on the fly" log scanning that scans log entries as they are generated as part of a process or a technique for scanning a collection of log entries, such as all or a portion of a generated log. At 410, a log entry is received from a process or is read during log scanning. It is determined at 420 whether the entry should be added to an alternate log. If not, the method 400 returns to 410 (provided the logged process continues or log entries remain to be processed). If so, the log entry is written to an alternate log (e.g., a collection of log entries) at 430, after which the method 400 returns to 410 (provided the logged process continues or log entries remain to be processed). Writing the log entry at 420 can include sending the log entry to a logging service, such as the logging service 138 of FIG. 1.

Example 5) —Example Differential Logging During Process Execution

Figure 5:
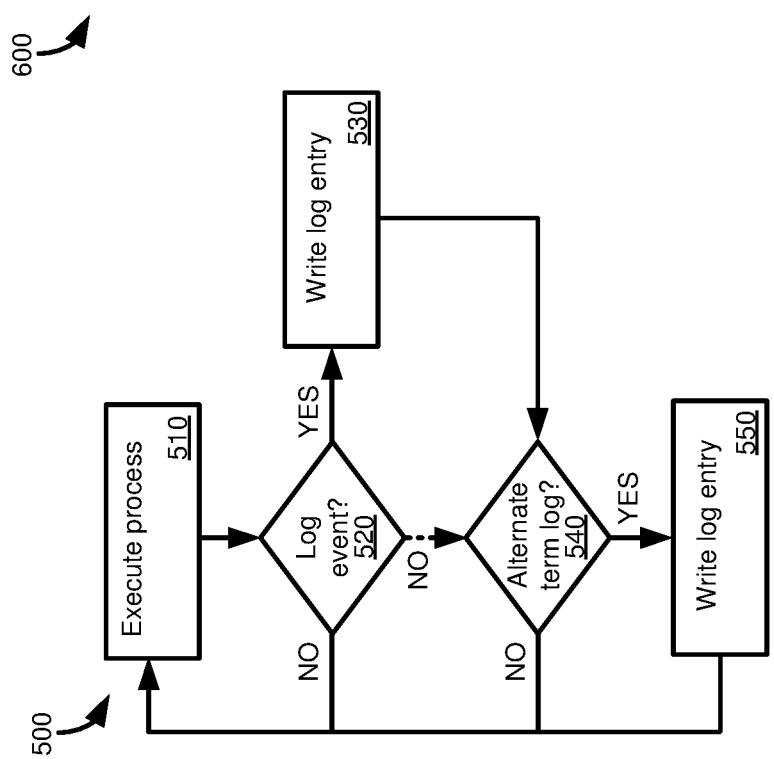
FIGS. 4 and 5 are flowcharts of example differential logging processes according to embodiments of the present disclosure.

FIG. 5 provides a flowchart of a method 500 for differential logging. The method 500 can represent a technique for logging where a software-implemented process contains instructions that indicate whether a particular step in the process should result in a log entry being written to a first log (or being sent to a logging service), being written to a second log (or being sent to a logging service), or being written to both the first and second logs (which can be accomplished by sending a log entry to the logging service with directions to store the log entry in different logs maintained by the logging service or by sending the log entries to different logging services or different processes of a single logging service).

At 510 a step (e.g., an instruction or set of instructions embodied in software instructions generated from software code) of a process is executed. It is determined at 520 whether the process step is a logged event for a first log. If so, a log entry is written to a first log (or sent to a log service, which can be implemented as described in Example 2) at 530, where the method 500 then proceeds to 540. If the step is determined at 520 not to be a logged event, in a first embodiment, the process 500 returns to 510 where a next step in the process is executed. In a second embodiment, the process 500 proceeds to 540.

At 540 it is determined whether the step should be written to an alternate log, such as a log that is maintained for a shorter time than a log to which a log entry was written at 530. If so, a log entry is written to the alternate log (or is sent to a logging service) at 550. If the step is determined at 540 not to be written to the alternate log, the method 500 returns to 510 (provided the process has additional steps).

Figure 6:
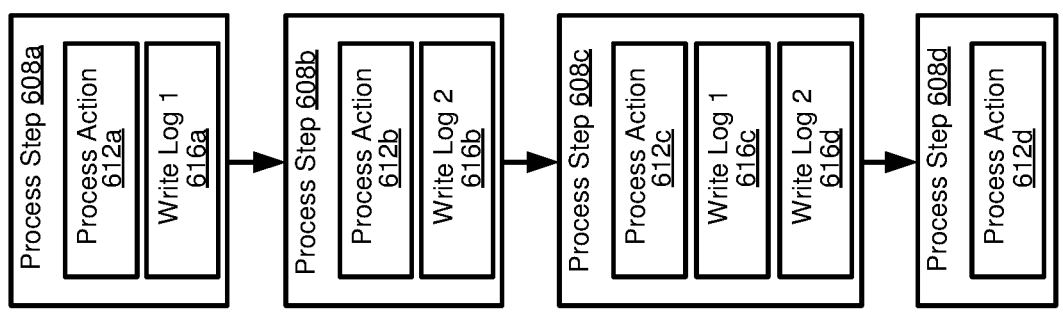
FIG. 6 illustrates an example computing process with logging operations.

Example 6) —Example Computer-Implemented Process with Differential Logging Operations FIG. 6 illustrates an example computer-implemented process 600 that includes a plurality of process steps 608 (shown as steps 608a-608d), where each process step includes at least one action 612 (shown as actions 612a-612d) and at least a portion of the process steps include logging commands 616 (shown as logging commands 616a-616d).

A process action 612 can represent one or more lines of software code, where the one or more lines implement the particular process step 608. Typically, the logging commands 616 are placed in the code such that they are executed when the corresponding code for the process action 612 executes, or depending on the execution results of the corresponding code (e.g., whether a process completes successfully or not). It should be appreciated that multiple logging commands 616 can be included for a given process action 612, and at least some of these logging commands can be conditional (e.g., write to log X if true, write to log Y if false).

As a particular example, the process 600 can represent a database backup process. A particular process step 608 can represent initiation of the backup process, and the corresponding process action 612 can be an action that initiates the backup process. In this case, a logging command 616 associated with the process step 608 can cause a log entry to be written to one or more logs indicating that the backup process was initiated. Note that in a similar manner as some process steps 608 need not have logging commands 616, some process steps need not have process actions 612. That is, a given process step 608 can simply be a log writing step. In addition, logging commands 616 can be carried out in a different order than that illustrated for the process 600. For example, a logging command 616 can write a log entry indicating that a process step 608 for a database backup job was initiated before any process actions 612 are executed that carry out the backup job.

In the process 600, two logs (collections of log entries) can be written to. One log can be stored for a comparatively shorter time and another log can be stored for a comparatively longer time. In a process step 608a, a process action 612a is executed and a logging command 616a results in a log entry being written to the first log. A process step 608b involves the execution of a process action 612b and a logging command 616b results in a log entry being written to a second log. Process step 608c includes the execution of a process action 612c and logging commands 616c, 616d that result in log entries in the first log and in the second log. The final illustrated process step 608d involves the execution of a process action 616d but does not involve any logging commands.

Example 7) —Example Differential Logging in Database Backup and Recovery Processes Disclosed techniques can find use in a variety of scenarios. However, a particular use case involves logging associated with database backup and recovery operations. Databases can maintain critical information, and some entities which maintain databases may be subject to governmental or contractual obligations with respect to data. Database service providers, such as those who provide database hardware, software, or management services, including those who provide database services in a hyperscalar environment (e.g., "cloud based" services) can be subject to government or contractual obligations.

Part of maintaining a database, including as part of providing databases services to customers, can include creating backup copies of a database at regular intervals, upon triggering events, or when manually requested. Backup data may be encrypted, and periodically keys used to encrypt the data may be changed to help maintain data security. Backup data can be deleted, such as when the backup data becomes stale or is superseded by a more recent backup or if the database represented by the backup was deprovisioned/removed. Backup data can also be restored to a database, such as if the database experiences a hardware failure or a software issue that requires a restart of the database system.

One or more of these database backup/recovery operations can be associated with logging activity, which can benefit from disclosed technologies. The amount of information in logs associated with database backup and recovery operations can be voluminous. The volume is compounded when considering the number of backup and recovery operations that may occur (for example, if backups are made on a daily basis) and the number of databases that may be involved, particularly as even a single entity may maintain multiple databases and database service providers may provide one or multiple databases to multiple clients.

Logging information can include detailed operations about backup or recovery processes, including detailed logs of how backup jobs were processed, such as individual tables or files that were processed. This information may not be commonly used, but can be useful, such as if a backup or recovery job fails. Because the detailed logged information is most likely to be useful at times close to when the job occurred, such as to troubleshoot a failure, detailed logs may be kept for a comparatively short period, such as days or weeks. After that, the cost (in terms of computing resources) of maintaining the data can outweigh the likelihood that the data may later be of use. In addition, maintaining data backups can raise security or confidentiality concerns (for example, data protection and privacy laws or regulations may limit how long data can be maintained, particularly in the absence of an authorized reason for maintaining the data).

However, as mentioned above, there can be cases where a portion of logged data may be useful for longer time periods. For instance, while the minute details of how backup job was carried out may not be relevant after a certain period of time, it still may be useful, such as for auditing purposes, to have records showing that a backup job was initiated, whether the job completed successfully or not, and information to describe at least certain parameters of the backup job (e.g., identifying when a backup job was initiated, an identifier of a database system being backed up, an identifier of a backup job that can be referenced to determine parameters of the backup, such as data to be included in the backup). Prior to the disclosed technologies, detailed backup logs were typically not kept for extended durations, meaning that backup job information would be unavailable after a comparatively short period of time. Even if some backup logs were maintained for longer periods of time, they typically were the same logs that were initially generated, meaning that the logs were voluminous and contained information that was less likely to be useful after a comparatively short period of time passed, resulting in both wasted resources in maintaining the logs and in locating information of interest in the logs if it turned out the logs were reviewed at a later date.

Figure 7:
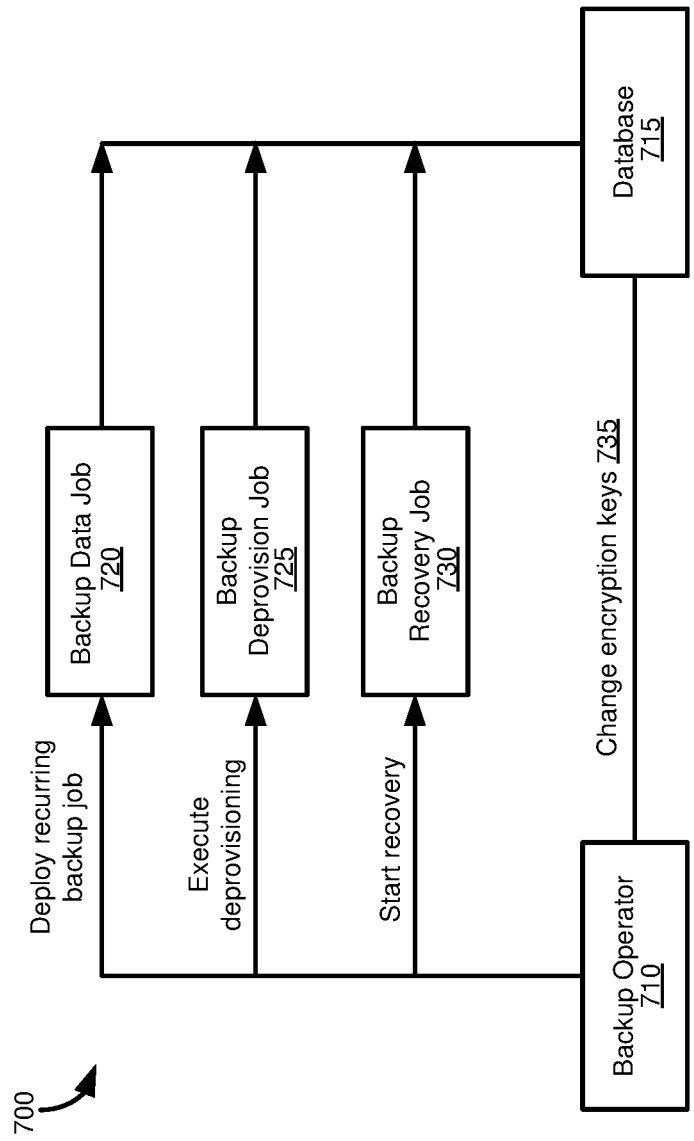
FIGS. 7 and 8 are diagrams of example computing environments in which differential logging can be used with database backup and recovery operations.

FIG. 7 illustrates a computing environment 700 where a backup operator 710, such as described in Example 3, is used to manage at least certain backup and recovery operations for a database 715. One task performed by the backup operator 710 is a backup data job 720, such as a recurring backup job or a backup job triggered by particular criteria being satisfied or when manually requested. The data backup job 720 reads at least a portion of data in the database 715 (e.g., a particular selection of tables and views stored by the database, and optionally information used in executing database operations, such as data dictionaries, statistics, query plans, or indexes) and stores a copy of the data. The backup data can be stored in the database 715 or in another location (not shown). For example, backup data may be stored in a remote system that may have higher storage capacity than the database 715, or if it otherwise desired not to occupy storage of the database 715 with backup data. As has previously been described, generally, logs associated with a data backup job 720 can include details about when a job was started, job parameters, individual job steps (e.g., individual backup operations for particular data processed by the backup job), and an indication of whether the job completed successfully.

Another task that can be performed by the backup operator 710 is a backup deprovisioning job 725. A backup deprovisioning job 725 removes data from one or more prior data backup jobs 720. For example, data backups may be removed when a database is deprovisioned (deleted), including when a customer of a database service provider terminates their relationship with the provider, when the database is deleted (such as because it is no longer being used or because all or a portion of the database is being transitioned to another database, which can be a database having a different storage model or schema than the original database), or when the database backup is superseded by another database backup or the database backup becomes stale. Although shown as communicating with the database 715, in some cases a deprovisioning job 725 communicates with another computing system, such as a system remote from the database system that is used to store backup information. Log entries created during a backup deprovisioning job 725 can include an identifier of when the deprovisioning job was initiated, parameters for the deprovisioning job (e.g., how database backups to be removed are to be identified), individual deprovisioning operations (e.g., commands to delete particular data in the backup job), or an indication of whether a backup deprovisioning job completed successfully.

The backup operator 710 can institute a backup recovery job 730, where backup data, such as from a backup job 720, is restored to the database 715. Log entries created during the backup recovery job 730 can include an identifier of when the job was initiated, an identifier of the database 715, an identifier of a particular backup to be restored, log entries for individual restoration operations (e.g., processing of particular files, tables, etc. in backup data), or an indication of whether the recovery job completed successfully.

An encryption key change job 735 can also be performed by the backup operator 710. In some cases, newly received keys are used to encrypt newly created backups. In other cases, newly received keys are used to encrypt newly created backups but are also used to reencrypt data from prior backup jobs 720. Encryption keys can be used for additional purposes, such as to encrypt logs associated with backup or recovery operations. Logs for encryption key change jobs 735 can include entries for when a job was initiated, the target for a job (e.g., a particular database system 715, particular backup data), operations performed during the job (e.g., keys removed, keys added, backup data that was re-encrypted), or indications of whether the job, or particular job components (e.g., backup data re-encryption), completed successfully.

Figure 8:
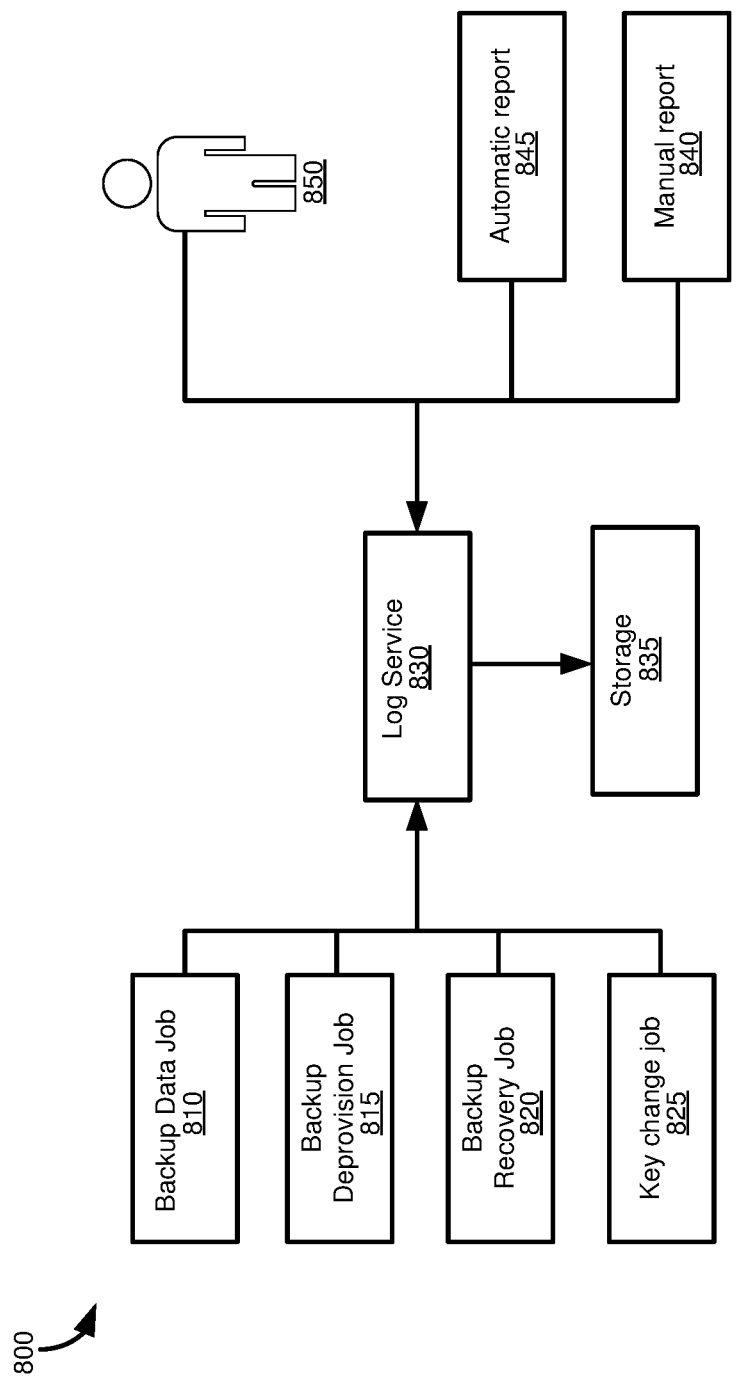

FIG. 8 illustrates a computing environment 800 in which disclosed technologies can be used to facilitate the various backup operations shown in the computing environment 700 of FIG. 7. The computing environment 800 shows a backup data job 810, a backup deprovision job 815, a backup recovery job 820, and a key change job 825 interacting with a log service 830. The backup data job 810, the backup deprovision job 815, the backup recovery job 820, and the key change job 825 can be analogous to the correspondingly titled jobs 720-735 of FIG. 7.

The log service 830 can be a service that processes and manages logs or log entries, including maintaining the logs in a storage 835 and retrieving logs or log entries upon request. In a particular example, including when disclosed technologies are used with an application management system such as DOCKER and KUBERNETES, the log service 830 can be the LOKI log aggregation system (Grafana Labs, New York, NY). LOKI can apply labels to logs or log entries, which can be used to develop indexes that can be used to search the logs. The logs themselves can be maintained in a compressed state. Log compression results in additional computing resource (storage) savings beyond those provided by differential logging itself—storing only selected log entries.

Log entries can be identified and retrieved from the storage 835 in response to queries from a variety of sources. In some cases, a user, such as a user of an entity whose data is reflected in the logs, can request manual reports 840 or automatic reports 845 can periodically be generated. In other cases, an auditor 850 can request that particular log data be retrieved from storage, such as to determine if backup jobs were conducted as required, and as a starting point to determine whether any failed backup jobs were adequately investigated and resolved.

Example 8) —Example Differential Logs and Log Storage Techniques

FIGS. 9A-9Z and 10A-10P illustrate example entries in a log 900. It can be seen that the log entries are detailed and numerous. While these log entries can be useful for some purposes, such as troubleshooting a failed process, they contain much more detail than is needed for other purposes, such as auditing. In some cases, the only entries from FIGS. 9A-9Z and 10A-10P that are relevant to longer term uses, such as auditing, are:

{"log":"DB_H00/backup.log: 2021-11-01T10:22:37+00:00 P0002344 17cdb05b99b INFO BACKUP SAVE DATA started [1635762157979]\n","stream":"stdout", "time":"2021-11-01T10:22:38.768102517Z"}

{"log":"DB_H00/backup.log: 2021-11-01T10:22:53+00:00 P0002344 17cdb05b99b INFO BACKUP SAVE DATA finished successfully\n","stream":"stdout", "time":"2021-11-01T10:22:53.483382664Z"}

These log entries indicate when a backup process initiated, when it finished, and the manner in which the backup process completed (in this case that it completed successfully). It can thus be seen that differential logging can greatly reduce the amount of log information that is stored, such as when only a subset of information may be relevant to uses which may arise comparatively longer after the generation of the logs. As discussed in earlier examples, in some cases the two log entries above can be identified by scanning a complete or partial log, such as for particular keywords. Assuming such terms are unique, or can be combined with other terms or textual tokens to uniquely identify entries, string-based searching for "started" and "finished" may be used to identify the above entries. Or, rather than scanning a complete or partial log, log entries can be scanned as they are generated and entries satisfying search criteria can be stored in a primary log and an alternate log. However, text-based scanning can be both time and computing resource intensive, and can be difficult to implement in a way that catches all relevant log entries and excludes irrelevant log entries. Thus, particularly when a comparatively small number of events are to be logged, it can be advantageous to include in code implementing a particular process commands to write log entries to all relevant logs.

FIG. 11 illustrates additional examples of log entries 1110 that may be useful for long term retention for a backup process, such as for purposes of auditing to confirm whether backup operations were conducted and results of such backup operations. For a log entry 1110a, FIG. 11 illustrates labels 1120 that were associated with the log entry 1110a, where the labels can be used to index log entries, including so that log entry 1110*a* can be retrieved in response to relevant search criteria (e.g., search criteria that includes one or more of the labels 1120). In some cases, labels 1120 are not sufficient to retrieve particular log entries of interest, but can retrieve a smaller subset of log entries that can then be further searched, such as using text-based searching.

Note that the log labels 1120 in this case are not part of the log entry 1110*a* itself. Instead, the log labels 1120 can be supplied in metadata provided with the log entries 1120. In other cases, all or a portion of the log labels 1120 can be extracted from the log entries. Further, information extracted from a log entry 1110 can be applied to other log entries that do not include such information, in some cases. In the example shown, the "event" label 1120*a* could be extracted from a log entry initiating the event, and subsequent relevant log entries could be labelled with the extracted event name.

Example 9) —Example Implementations

Figure 12:
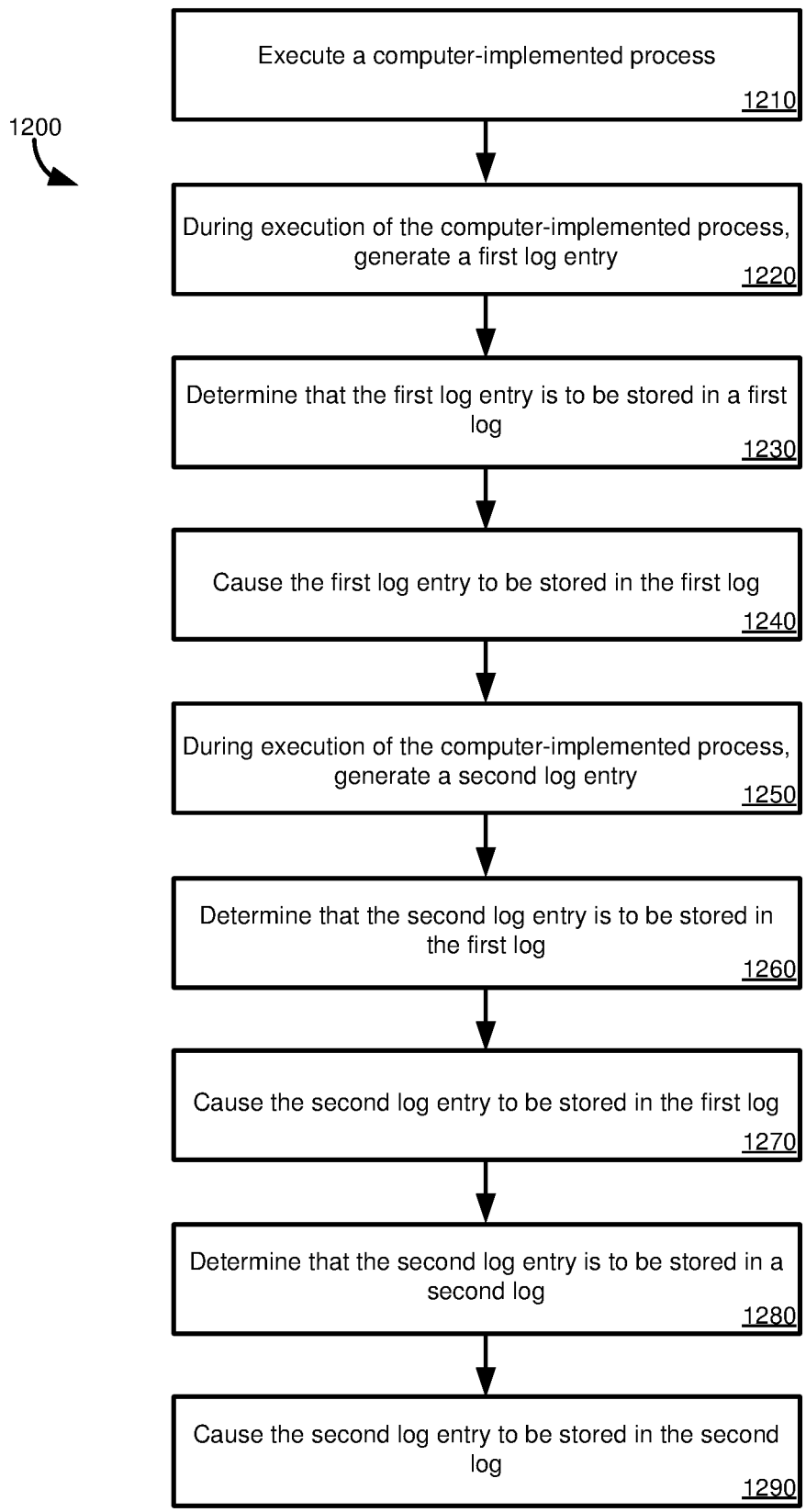
FIG. 12 is a flowchart of operations in an example method of differential logging.

FIG. 12 illustrates a method 1200 for differential logging according to an embodiment of the present disclosure. The method 1200 can be implemented in various disclosed computing environments, including the computing environment 100 of FIG. 1, the computing environment 200 of FIG. 2, the computing environment 700 of FIG. 7, or the computing environment 800 of FIG. 8.

At 1210, a computer-implemented process is executed, such as a process associated with database backup or recovery. During execution of the computer-implemented process, a first log entry is generated at 1220. At 1230, it is determined that the first log entry is to be stored in a first log. The first log entry is caused to be stored in the first log at 1240.

At 1250, during execution of the computer-implemented process, a second log entry is generated. At 1260, it is determined that the second log entry is to be stored in the first log. The second log entry is caused to be stored in the first log at 1270. At 1280, it is determined that the second log entry is to be stored in a second log. The second log entry is caused to be stored in the second log at 1290. The first log entry is not stored in the second log.

Although the terms "first" and "second" have been used with respect to the method 1200, it should be appreciated that these terms are used to convey that the log entries are different, not that one log entry is generated before the other. For example, in some cases the second log entry is generated and stored in the first and second logs before the first log entry is generated.

Example 10) —Computing Systems

Figure 13:
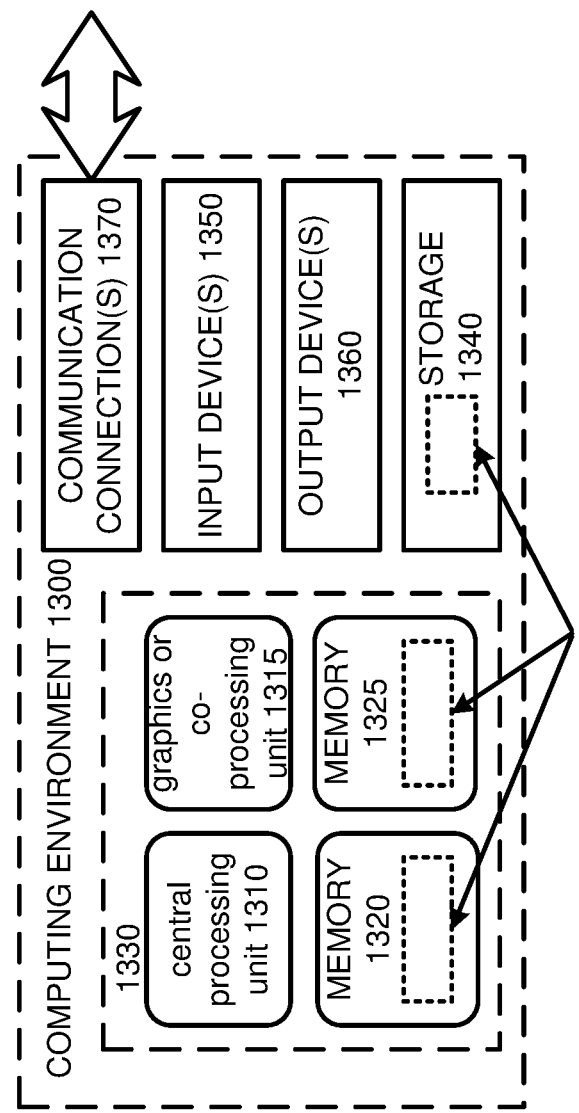
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the environment 100 of FIG. 1, the computer environment 200 of FIG. 2, the computer environment 700 of FIG. 7, or the computing environment 800 of FIG. 8, including as described in Examples 1-9. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way, and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11) —Cloud Computing Environment

Figure 14:
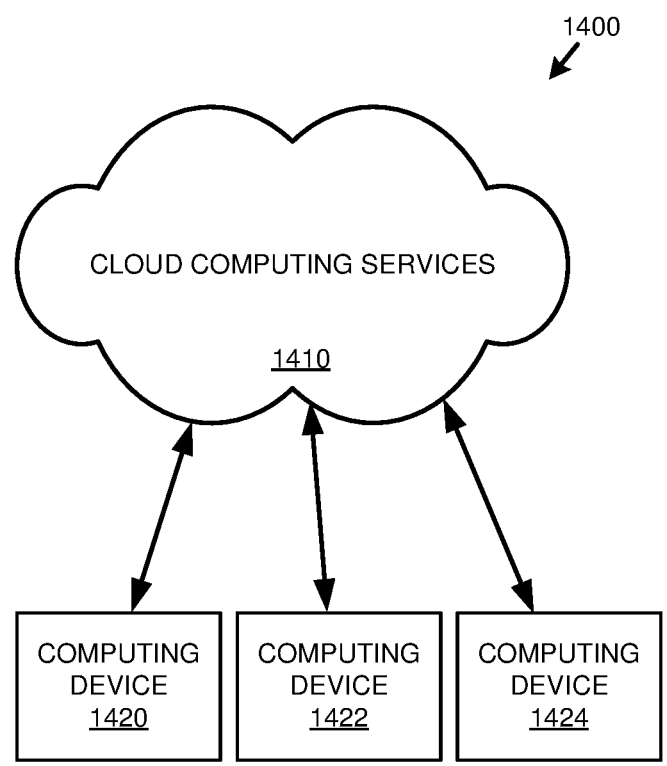
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 12) —Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer readable storage media storing computer-executable instructions that, when executed, cause the computing system to perform operations comprising:
      executing a computer-implemented process;
      during the executing, generating a first log entry;
      causing the first log entry to be stored in a first log;
      determining that the first log entry satisfies at least one selection criterion of a defined set of one or more selection criterion indicating that a log entry associated with the computer-implemented process is also to be stored in a second log, the second log being different than the first log;
      based on determining that the first log entry satisfies the at least one selection criterion, causing the first log entry to be stored in the second log;
      during the executing, generating a second log entry;
      determining that the second log entry does not satisfy any selection criterion of the defined set of one or more selecting criterion;
      based on determining that the second log entry does not satisfy any selection criterion, causing the second log entry to be stored in the first log and not in the second log.

2. The computing system of claim 1, wherein log entries stored in the second log are maintained for a longer period of time than a period of time for which log entries in the first log are maintained.

3. The computing system of claim 1, wherein log entries of the second log are a proper subset of log entries of the first log.

4. The computing system of claim 1, wherein the causing the first log entry to be stored in the second log comprises causing the first log entry to be sent to a logging service.

5. The computing system of claim 4, wherein the first log entry is sent to the logging service with metadata useable to index the first log entry.

6. The computing system of claim 4, the operations further comprising:
   with the logging service, extracting a portion of the first log entry corresponding to a label used by the logging service to index received log entries.

7. The computing system of claim 4, wherein the logging service receives log entries from a plurality of computing systems.

8. The computing system of claim 4, wherein one or more labels received with, or extracted from, the first log entry are used to index the first log entry, the operations further comprising:
   by the logging service, compressing the first log entry.

9. The computing system of claim 1, wherein determining that the second log entry is to be stored in the second log comprises scanning a log comprising the first log entry and the second log entry.

10. The computing system of claim 1, wherein determining that the first log entry is to be stored in the second log comprises executing software code implementing the computer-implemented process causing the first log entry to be stored in the second log.

11. The computing system of claim 1, wherein the computer-implemented process comprises a data backup process and the first log entry indicates initiation of the data backup process.

12. The computer system of claim 11, wherein the data backup process is executed by a database system.

13. The computing system of claim 1, wherein the computer-implemented process comprises a data recovery process and the first log entry indicates initiation of the data recovery process.

14. The computing system of claim 1, wherein the computer-implemented process comprises a data deprovisioning process and the first log entry indicates initiation of the data deprovisioning process.

15. The computing system of claim 1, wherein the computer-implemented process comprises an encryption key exchange process and the first log entry indicates initiation of the encryption key exchange process.

16. The computing system of claim 1, wherein the computer-implemented process is initiated by an operator implemented in software.

17. The computing system of claim 1, the operations further comprising:
   receiving a request for one or more log entries, the request comprising request criteria;
   determining that the first log entry is responsive to the request; and
   returning the second log entry in response to the request.

18. One or more computer-readable storage media comprising:
   computer-executable instructions that, when executed by a computing system comprising at least one hardware processor and at least one memory coupled to the at least one hardware processor, cause the computing system to execute a computer-implemented process;
   computer-executable instructions that, when executed by the computing system, cause the computing system to, during execution of the computer-implemented process, generate a first log entry and store the first log entry to a first log and not to a second log different than the first log;
   computer-executable instructions that, when executed by the computing system, cause the computing system to, during execution of the computer-implemented process, generate a second log entry and store the first log entry in the first log;
   computer-executable instructions that, when executed by the computing system, cause the computing system to determine that the second log entry is to be stored in a second log using a set of one or more selection criterion; and
   computer-executable instructions that, when executed by the computing system, cause the computing system to cause the second log entry to be stored in the second log.

19. A method, implemented in a computing environment comprising a computing system comprising at least one hardware processor and at least one memory coupled to the at least one hardware processor, the method comprising:
   executing a computer-implemented process;
   during the executing, generating a first log entry;
   causing the first log entry to be stored in a first log;

as part of a logging process that determines whether a log entry should also be written to at least a second log, the at least a second log being different than the first log, determining whether content of the first log entry satisfies at least one selection criterion of a set of one or more selection criterion, determining that the first log entry is to be stored in a first log;

causing the first log entry to be stored in the at least a second log in addition to the first log;

during the executing, generating a second log entry;

causing the second log entry to be stored in the first log; and determining from content of the second log entry that the second log entry does not satisfy at least one selection criteria of the set of one or more selection criterion, and is thus not stored in the at least a second log.

20. The computing system of claim 1, wherein at least one selection criterion of the set of one or more selection criterion comprises an operation type.

21. The one or more computer-readable storage media of claim 18, wherein log entries stored in the second log are maintained for a longer period of time than a period of time for which log entries in the first log are maintained.

22. The one or more computer-readable storage media of claim 18, wherein log entries of the second log are a proper subset of log entries of the first log.

23. The one or more computer-readable storage media of claim 18, wherein the computer-implemented process is initiated by an operator implemented in software.

24. The one or more computer-readable storage media of claim 18, wherein determining that the first log entry is to be stored in the second log comprises executing software code implementing the computer-implemented process causing the first log entry to be stored in the second log.

25. The method of claim 19, wherein log entries stored in the second log are maintained for a longer period of time than a period of time for which log entries in the first log are maintained.

26. The method of claim 19, wherein log entries of the second log are a proper subset of log entries of the first log.

27. The method of claim 19, wherein the computer-implemented process is initiated by an operator implemented in software.

28. The method of claim 19, wherein determining that the first log entry is to be stored in the second log comprises executing software code implementing the computer-implemented process causing the first log entry to be stored in the second log.

29. The method of claim 19, further comprising:
receiving a request for one or more log entries, the request comprising request criteria;
determining that the first log entry is responsive to the request; and
returning the second log entry in response to the request.

30. The method of claim 19, wherein the computer-implemented process comprises a data backup process and the first log entry indicates initiation of the data backup process.

* * * * *